(12) United States Patent
Foehr et al.

(10) Patent No.: US 7,755,786 B2
(45) Date of Patent: *Jul. 13, 2010

(54) SYSTEMS AND METHODS FOR SUPPORT OF VARIOUS PROCESSING CAPABILITIES

(75) Inventors: Oliver H. Foehr, Mercer Island, WA (US); Daniel F. Emerson, Redmond, WA (US); Craig I. McLuckie, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1089 days.

This patent is subject to a terminal disclaimer.

(21) Appl. No.: 10/935,249

(22) Filed: Sep. 7, 2004

(65) Prior Publication Data

US 2005/0243355 A1 Nov. 3, 2005

Related U.S. Application Data

(60) Provisional application No. 60/567,679, filed on May 3, 2004, provisional application No. 60/567,663, filed on May 3, 2004, provisional application No. 60/567,890, filed on May 3, 2004, provisional application No. 60/567,920, filed on May 3, 2004, provisional application No. 60/567,830, filed on May 3, 2004, provisional application No. 60/568,071, filed on May 3, 2004.

(51) Int. Cl.
*G06F 3/12* (2006.01)
*G06F 17/00* (2006.01)
*G06F 3/00* (2006.01)

(52) U.S. Cl. .................... 358/1.15; 358/1.13; 715/205; 715/209; 719/332

(58) Field of Classification Search ...................... None
See application file for complete search history.

(56) References Cited

U.S. PATENT DOCUMENTS

| 4,410,286 A | 10/1983 | Ko et al. |
| 4,594,674 A | 6/1986 | Boulia et al. |
| 4,649,513 A | 3/1987 | Martin et al. |
| 4,870,611 A | 9/1989 | Martin et al. |
| 5,179,702 A | 1/1993 | Spix et al. |
| 5,222,205 A | 6/1993 | Larson et al. |
| 5,469,532 A | 11/1995 | Gerlach et al. |
| 5,469,533 A | 11/1995 | Dennis |
| 5,487,138 A | 1/1996 | Rust et al. |

(Continued)

OTHER PUBLICATIONS

Windows NT 4_0.pdf.*

(Continued)

*Primary Examiner*—Twyler L Haskins
*Assistant Examiner*—Barbara D Reinier
(74) *Attorney, Agent, or Firm*—Lee & Hayes, PLLC

(57) ABSTRACT

Systems and methods are described for support of various computing device and target entity capabilities. In an implementation, a method includes determining one or more processing capabilities of a computing device to process data for rendering by a rendering device. A selection is made, based on the determining, of one or more filters to provide data configured for rendering by the rendering device and that provides at least one processing capability that is not included in the one or more processing capabilities of the computing device.

11 Claims, 13 Drawing Sheets

U.S. PATENT DOCUMENTS

| | | | |
|---|---|---|---|
| 5,537,526 A | 7/1996 | Anderson et al. | |
| 5,613,124 A | 3/1997 | Atkinson et al. | |
| 5,699,493 A | 12/1997 | Davidson, Jr. et al. | |
| 5,727,220 A | 3/1998 | Hohensee et al. | |
| 5,745,121 A | 4/1998 | Politis | |
| 5,745,122 A | 4/1998 | Gay et al. | |
| 5,745,910 A | 4/1998 | Piersol et al. | |
| 5,752,055 A | 5/1998 | Redpath et al. | |
| 5,752,056 A | 5/1998 | Celik | |
| 5,806,078 A | 9/1998 | Hug et al. | |
| 5,819,295 A | 10/1998 | Nakagawa et al. | |
| 5,845,058 A | 12/1998 | Shaw et al. | |
| 5,903,903 A | 5/1999 | Kennedy | |
| 5,905,504 A | 5/1999 | Barkans et al. | |
| 5,911,138 A | 6/1999 | Li et al. | |
| 5,920,684 A | 7/1999 | Hastings et al. | |
| 5,940,581 A | 8/1999 | Lipton | |
| 5,950,215 A | 9/1999 | Tabuchi | |
| 5,960,168 A | 9/1999 | Shaw et al. | |
| 5,993,088 A | 11/1999 | Nogay et al. | |
| 6,026,416 A | 2/2000 | Kanerva et al. | |
| 6,070,175 A | 5/2000 | Mezei | |
| 6,094,665 A | 7/2000 | Lyons et al. | |
| 6,134,552 A | 10/2000 | Fritz et al. | |
| 6,138,162 A | 10/2000 | Pistriotto et al. | |
| 6,144,974 A | 11/2000 | Gartland | |
| 6,173,295 B1 * | 1/2001 | Goertz et al. | 715/209 |
| 6,182,080 B1 | 1/2001 | Clements | |
| 6,182,096 B1 | 1/2001 | Mastie et al. | |
| 6,195,676 B1 | 2/2001 | Spix et al. | |
| 6,199,082 B1 | 3/2001 | Ferrel et al. | |
| 6,212,530 B1 | 4/2001 | Kadlec | |
| 6,247,018 B1 | 6/2001 | Rheaume | |
| 6,247,066 B1 | 6/2001 | Tanaka | |
| 6,269,403 B1 | 7/2001 | Anders et al. | |
| 6,344,855 B1 | 2/2002 | Fisher et al. | |
| 6,362,870 B2 | 3/2002 | Mui et al. | |
| 6,385,727 B1 | 5/2002 | Cassagnol et al. | |
| 6,407,821 B1 | 6/2002 | Hohensee et al. | |
| 6,418,448 B1 | 7/2002 | Sarkar | |
| 6,427,230 B1 | 7/2002 | Goiffon et al. | |
| 6,447,184 B2 | 9/2002 | Kimura et al. | |
| 6,449,653 B2 | 9/2002 | Klemets et al. | |
| 6,457,017 B2 | 9/2002 | Watkins et al. | |
| 6,466,935 B1 | 10/2002 | Stuart | |
| 6,480,206 B2 | 11/2002 | Prinzing | |
| 6,498,657 B1 | 12/2002 | Kuntz et al. | |
| 6,505,219 B1 * | 1/2003 | MacLean et al. | 715/205 |
| 6,507,858 B1 | 1/2003 | Kanerva et al. | |
| 6,519,557 B1 | 2/2003 | Emens et al. | |
| 6,538,760 B1 | 3/2003 | deBry et al. | |
| 6,549,918 B1 | 4/2003 | Probert, Jr. et al. | |
| 6,571,279 B1 | 5/2003 | Herz et al. | |
| 6,583,789 B1 | 6/2003 | Carlson et al. | |
| 6,591,278 B1 | 7/2003 | Ernst | |
| 6,604,144 B1 | 8/2003 | Anders | |
| 6,608,693 B1 | 8/2003 | Loyd et al. | |
| 6,609,200 B2 | 8/2003 | Anderson et al. | |
| 6,615,281 B1 | 9/2003 | Temple, III | |
| 6,654,147 B1 | 11/2003 | Ramot | |
| 6,657,647 B1 | 12/2003 | Bright | |
| 6,658,477 B1 | 12/2003 | Lisitsa et al. | |
| 6,674,540 B1 | 1/2004 | Wiechers et al. | |
| 6,675,353 B1 | 1/2004 | Friedman | |
| 6,675,356 B1 | 1/2004 | Adler et al. | |
| 6,681,223 B1 | 1/2004 | Sundaresan | |
| 6,715,126 B1 | 3/2004 | Chang et al. | |
| 6,763,343 B1 | 7/2004 | Brooke et al. | |
| 6,765,584 B1 | 7/2004 | Wloka et al. | |
| 6,771,291 B1 | 8/2004 | DiStefano, III | |
| 6,781,609 B1 | 8/2004 | Barker et al. | |
| 6,785,654 B2 | 8/2004 | Cyr et al. | |
| 6,789,229 B1 | 9/2004 | Dunietz et al. | |
| 6,812,941 B1 | 11/2004 | Brown et al. | |
| 6,826,626 B1 | 11/2004 | McManus | |
| 6,867,874 B1 | 3/2005 | Shima | |
| 6,891,632 B2 | 5/2005 | Schwartz | |
| 6,910,843 B2 | 6/2005 | Saw et al. | |
| 6,917,976 B1 | 7/2005 | Slaughter et al. | |
| 6,925,597 B2 | 8/2005 | Anwar | |
| 6,941,511 B1 | 9/2005 | Hind et al. | |
| 6,944,515 B2 | 9/2005 | Nakajima et al. | |
| 6,952,801 B2 | 10/2005 | Warmus et al. | |
| 6,968,557 B1 | 11/2005 | Zhang et al. | |
| 6,990,654 B2 | 1/2006 | Carroll, Jr. | |
| 6,992,785 B1 | 1/2006 | Chatcavage et al. | |
| 7,017,162 B2 | 3/2006 | Smith et al. | |
| 7,027,660 B2 | 4/2006 | Hersch et al. | |
| 7,043,688 B1 * | 5/2006 | Tsutsumi et al. | 715/255 |
| 7,047,237 B2 | 5/2006 | Suzuki et al. | |
| 7,051,276 B1 | 5/2006 | Mogilevsky et al. | |
| 7,051,330 B1 | 5/2006 | Kaler et al. | |
| 7,092,963 B2 | 8/2006 | Ryan et al. | |
| 7,103,625 B1 | 9/2006 | Hipp et al. | |
| 7,106,275 B2 | 9/2006 | Brunner et al. | |
| 7,131,060 B1 | 10/2006 | Azuma | |
| 7,134,071 B2 | 11/2006 | Ohwada et al. | |
| 7,136,941 B2 | 11/2006 | Nguyen et al. | |
| 7,162,538 B1 | 1/2007 | Cordova | |
| 7,171,471 B1 | 1/2007 | Nair | |
| 7,181,731 B2 | 2/2007 | Pace et al. | |
| 7,209,921 B2 | 4/2007 | Pace et al. | |
| 7,271,935 B2 | 9/2007 | Coons et al. | |
| 7,274,483 B2 | 9/2007 | Aiyama et al. | |
| 7,302,634 B2 | 11/2007 | Lucovsky et al. | |
| 7,359,902 B2 | 4/2008 | Ornstein et al. | |
| 7,426,525 B2 | 9/2008 | Sayers et al. | |
| 2001/0003828 A1 | 6/2001 | Peterson et al. | |
| 2001/0013043 A1 | 8/2001 | Wagner | |
| 2001/0018697 A1 | 8/2001 | Kunitake et al. | |
| 2001/0043358 A1 * | 11/2001 | Schwartz | 358/1.15 |
| 2001/0044809 A1 | 11/2001 | Parasnis et al. | |
| 2002/0002667 A1 | 1/2002 | Kelsey et al. | |
| 2002/0049790 A1 | 4/2002 | Ricker et al. | |
| 2002/0065848 A1 | 5/2002 | Walker et al. | |
| 2002/0073236 A1 | 6/2002 | Helgeson et al. | |
| 2002/0085020 A1 | 7/2002 | Carroll, Jr. | |
| 2002/0087602 A1 | 7/2002 | Masuda et al. | |
| 2002/0089691 A1 * | 7/2002 | Fertlitsch et al. | 358/1.15 |
| 2002/0099797 A1 | 7/2002 | Merrell et al. | |
| 2002/0107886 A1 | 8/2002 | Gentner et al. | |
| 2002/0111133 A1 | 8/2002 | Wittkotter | |
| 2002/0143523 A1 | 10/2002 | Balaji et al. | |
| 2002/0174145 A1 | 11/2002 | Duga et al. | |
| 2002/0188638 A1 | 12/2002 | Hamscher | |
| 2003/0009672 A1 | 1/2003 | Goodman | |
| 2003/0018694 A1 | 1/2003 | Chen et al. | |
| 2003/0028560 A1 | 2/2003 | Kudrolli et al. | |
| 2003/0078829 A1 | 4/2003 | Chen et al. | |
| 2003/0079181 A1 | 4/2003 | Schumacher et al. | |
| 2003/0093520 A1 | 5/2003 | Beesley | |
| 2003/0126136 A1 | 7/2003 | Omoigui | |
| 2003/0137539 A1 | 7/2003 | Dees | |
| 2003/0142325 A1 | 7/2003 | Leslie | |
| 2003/0149934 A1 | 8/2003 | Worden | |
| 2003/0158851 A1 | 8/2003 | Britton et al. | |
| 2003/0163552 A1 | 8/2003 | Savitzky et al. | |
| 2003/0163589 A1 | 8/2003 | Bunce et al. | |
| 2003/0167356 A1 | 9/2003 | Smith et al. | |
| 2003/0172168 A1 | 9/2003 | Mak et al. | |
| 2003/0182152 A1 | 9/2003 | Nakajima et al. | |
| 2003/0182311 A1 | 9/2003 | Nakajima et al. | |
| 2003/0182450 A1 | 9/2003 | Ong et al. | |
| 2003/0182656 A1 | 9/2003 | Leathers et al. | |

| | | |
|---|---|---|
| 2003/0187534 A1 | 10/2003 | Suzuki et al. |
| 2003/0187612 A1 | 10/2003 | Miyake |
| 2003/0187870 A1 | 10/2003 | Nakajima et al. |
| 2003/0195784 A1 | 10/2003 | Smith |
| 2003/0204495 A1 | 10/2003 | Lehnert |
| 2003/0229845 A1 | 12/2003 | Salesin et al. |
| 2003/0233420 A1 | 12/2003 | Stark et al. |
| 2004/0003388 A1 | 1/2004 | Jacquemot et al. |
| 2004/0003448 A1 | 1/2004 | Morrow et al. |
| 2004/0021905 A1 | 2/2004 | Holmstead et al. |
| 2004/0032611 A1* | 2/2004 | Daly et al. ............ 358/1.13 |
| 2004/0034848 A1 | 2/2004 | Moore et al. |
| 2004/0049737 A1 | 3/2004 | Hunt et al. |
| 2004/0054669 A1 | 3/2004 | Seyrat et al. |
| 2004/0061729 A1 | 4/2004 | Green et al. |
| 2004/0066527 A1 | 4/2004 | Kloosterman et al. |
| 2004/0078755 A1 | 4/2004 | Shinjo et al. |
| 2004/0080764 A1 | 4/2004 | Sievert et al. |
| 2004/0103073 A1 | 5/2004 | Blake et al. |
| 2004/0111418 A1 | 6/2004 | Nguyen et al. |
| 2004/0117733 A1 | 6/2004 | Moreau et al. |
| 2004/0130741 A1 | 7/2004 | Ferlitsch |
| 2004/0139049 A1 | 7/2004 | Hancock et al. |
| 2004/0153467 A1 | 8/2004 | Conover et al. |
| 2004/0160613 A1* | 8/2004 | Kurotsu et al. ............ 358/1.1 |
| 2004/0167941 A1 | 8/2004 | Prahlad et al. |
| 2004/0183837 A1 | 9/2004 | Watanabe et al. |
| 2004/0193599 A1 | 9/2004 | Liu et al. |
| 2004/0194025 A1 | 9/2004 | Hubert et al. |
| 2004/0205623 A1 | 10/2004 | Weil et al. |
| 2004/0205653 A1 | 10/2004 | Hadfield et al. |
| 2004/0207869 A1 | 10/2004 | Endo |
| 2004/0216048 A1 | 10/2004 | Brown et al. |
| 2004/0225960 A1 | 11/2004 | Parikh et al. |
| 2004/0230608 A1 | 11/2004 | Ornstein et al. |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0015767 A1 | 1/2005 | Nash et al. |
| 2005/0071385 A1 | 3/2005 | Rao |
| 2005/0086030 A1 | 4/2005 | Zeidman |
| 2005/0091574 A1 | 4/2005 | Maaniitty et al. |
| 2005/0097441 A1 | 5/2005 | Herbach et al. |
| 2005/0099398 A1 | 5/2005 | Garside et al. |
| 2005/0104894 A1 | 5/2005 | Sanborn et al. |
| 2005/0125720 A1 | 6/2005 | Little et al. |
| 2005/0132279 A1 | 6/2005 | Relyea et al. |
| 2005/0138540 A1 | 6/2005 | Baltus et al. |
| 2005/0144556 A1 | 6/2005 | Petersen et al. |
| 2005/0187803 A1 | 8/2005 | Jain et al. |
| 2005/0190186 A1 | 9/2005 | Klassen |
| 2005/0198069 A1 | 9/2005 | Cherry et al. |
| 2005/0210026 A1 | 9/2005 | Wood |
| 2005/0210227 A1 | 9/2005 | Emerson et al. |
| 2005/0223312 A1 | 10/2005 | Erdtmann et al. |
| 2005/0251742 A1 | 11/2005 | Mogilevsky et al. |
| 2005/0278240 A1 | 12/2005 | Delenda |
| 2005/0278616 A1 | 12/2005 | Eller |
| 2005/0278626 A1 | 12/2005 | Malik |
| 2005/0286063 A1 | 12/2005 | Owen et al. |
| 2006/0031749 A1 | 2/2006 | Schramm et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0080316 A1 | 4/2006 | Gilmore et al. |
| 2006/0117019 A1 | 6/2006 | Sylthe et al. |
| 2006/0117268 A1 | 6/2006 | Talley et al. |
| 2006/0136827 A1 | 6/2006 | Villaron et al. |
| 2006/0146353 A1 | 7/2006 | Yue et al. |
| 2006/0155529 A1 | 7/2006 | Ludviksson et al. |
| 2006/0206794 A1 | 9/2006 | Ornstein et al. |
| 2008/0021923 A1 | 1/2008 | Sedky et al. |

OTHER PUBLICATIONS

Adobe Photoshop release history.pdf.*
Supported file formats _Photoshop Elements 5_0_.pdf.*
Windows NT Server printing.pdf.*
Windows NT 4_0.pdf, Windows NT 4.0 release date Jul. 29, 1996.*
Adobe Photoshop release history.pdf, Adobe Photoshop release history.pdf, Adobe Photoshop 5.0 released May 1998, a common application.*
Supported file formats _Photoshop Elements 5_0_.pdf, Adobe Photoshop 5.0 released May 1998.*
Windows NT Server printing.pdf, Windows NT 4.0 release data Jul. 29, 1996.*
Ellis et al., "Postscrip, Bezier Curves and Chinese Character", ACM, 1989, pp. 162-165.
Chien, et al., "Effcient Schemes for Managing Multiversion XML Documents", University of California, California, Dec. 19, 2002, pp. 332-353.
Han, et al., "WebSplitter:A Unified XML Framework for Multi-Device Collaborative web browsing" IBM Thomas J. Watson research Centre, Hawthorne, CSCW, Dec. 2-6, 2000, ACM 1-58113-222-0/00/0012, pp. 221-230.
Hardy, et al., "Mapping and Displaying Structural Transformations between XML and PDF", ACM, 2002, pp. 95-102.
Jacobs et al.; "Adaptive Grid-Based Document Layout"; 2003 ACM; pp. 838-847.
Peters et al.,"CrystalWeb—A distributed authoring environment for the World-Wide Web" Computer Networks and ISDN Systems, North Holland Publishing. Amsterdam, NL. vol. 27, No. 6, Apr. 1995, pp. 861-870.
Orchard et al "[Editorial Draft] Versioning XML Languages W3C Proposed TAG finding." Nov. 16, 2003, pp. 1-23.
Orchard, "Versioning XML Vocabularies", published on XML.com, Dec. 3, 2003, pp. 1-10.
Bluethman, et al., "Interleaved Graphics and Text", IBM Technical Bulletin, Apr. 1980, vol. 22, No. 4, Oct. 1986, pp. 4813-4815.
Marco, et al., "A Framework for Designing and Implementing the Ada Standard Container Library", ACM 2003, pp. 49-61.
Holman; "What is XSL-FO", Google Mar. 20, 2002, pp. 1-4.
Pawson; "Printing from XML: An Introduction to XSL-FO", Google Oct. 9, 2002, pp. 1-4.
El-Kwae, et al., "Document Image Representation Using XML Technologies"; Proceedings of SPIE, vol. 4670. 2001, pp. 109-120.
Christodoulakis, et al., "Multimedia Document Presentation, Information Extraction, and Document Formation in MINOS: A Model and a System"; ACM Transaction on Office Information Systems, vol. 4, No. 4: Oct. 1986; pp. 346-383.
"Interleaved Graphics and Text" Bluethman et al., IBM Technical Disclosure Bulletin, Apr. 1980, vol. 22, No. 11., pp. 4813-4815.
Efficient Representation and Streaming of XML Content Over the Internet Medium Girardot et al., IEEE 2000 pp. 67-70.
Official Notice of Rejection for China Patent Application No. 200480001329.4, Dec. 18, 2007, pp. 1-16.
"@tryinCSS3 (was Useragent Rules in CSS)"; Mar. 31, 2004; http://lists.w3.org/Archives/Public/www-style/2004Mar/0333.html.; 2 pages.
"Interleaved Graphics and Text" Bluethman et al., IBM Technical Disclosure Bulletin, Apr. 1980, vol. 22, No. 11., pp. 4813-4815.
Akerlof, "The Market for "Lemons": Quality Uncertainty and the Market Mechanism", Quarterly Journal of Economics, vol. 84, Issue 3, Aug. 1970, pp. 488-500.
Devanur, et al., "An Improved Approximation Scheme for Computing Arrow-Debreu Prices for the Linear Case", retrieved on Nov. 10, 2008 at <<http://www.cc.gatech.edu/~nikhil/pubs/fsttcs.pdf>>, 2003, pp. 1-8.
Geanakoplos, et al., "The Arrow-Debreu Model of General Equilibrium", retrieved on Nov. 10, 2008 at <<cowles.econ.yale.edu>>, Cowles Foundation for Research in Economics at Yale University, 2004.
Jain, et al., "A Polynomial Time Algorithm for Computing an Arrow-Debreu Market Equilibrium for Linear Utilities", Proceedings of the 45th Annual IEEE Symposium on Foundations of Computer Science (FOCS '04), IEEE, 2004, pp. 1-9.

Jain, et al., "Approximating Market Equilibria", Springerlink, LNCS 2764, 2003, pp. 1-11.

Ashcraft, et al., "SPOOLES: An Object-Oriented Sparse Matrix Library", retrieved on Jan. 21, 2009 at <<http://citeseerx.ist.psu.edu/viewdoc/summary?doi=10.1.1.44.5809>>, Proceedings of the 9th SIAM Conference on Parallel Processing for Scientific Computing, pp. 1-10.

Levy, et al., "Non-Distorted Texture Mapping for Sheared Triangulated Meshes", The 25th Conference on Computer Graphics and Interactive Techniques, ACM, 1998, pp. 343-352.

Reguero, et al., "Large Scale Print Spool Service", retrieved on Jan. 21, 2009 at <<http://citeseerx.ist.psu.edu/viewdoc/summary?doi=10.1.1.107.7406>>, Proceedings of the Twelfth Systems Administration Conference (LISA 1998), Boston, Massachusetts, Dec. 6-11, 1998, pp. 1-15.

Shade, et al., "Layered Depth Images", The 25th Annual Conference on Computer Graphics and Interactive Techniques, ACM, 1998, pp. 231-242.

Kanzaki, "RSS—Summary and Release of Site Information," retrieved on Feb. 17, 2010 from <<http://web.archive.org/web/20040408231744/http://www.kanzaki.com/docs/sw/rss.html>>, Mar. 2, 2004.

Sun Microsystems, "JAR File Specification", retrieved on Feb. 17, 2010 at http://java.sun.com/j2se/1.5.0/docs/guide/jar/jar.html>>, 2003.

"SVG Print", W3C Working Draft, Jul. 15, 2003, http://www.w3.org/TR/2003/WD-SVGPrint-20030715/, pp. 1-14.

"Open eBook Publication Structure 1.2", Aug. 27, 2002, 91 pages.

"Networked File System"; http://www.scit.wlv.ac.uk/jphb/comms/nfs.htm.; 6 pages, Apr. 19, 2004.

"Apache Server Frequently Asked Questions"; Apache HTTP Server Version 1.3; http://httpd.apache.org/docs/misc/FAQ.html.; 35 pages, Apr. 19, 2004.

"URIQA! The URI Query Agent Model, A Semantic Web Enabler"; URIQA: The Nokia Query Agent; http://sw.nokia.com/uriqa/URIQA.html; 9 pages, Apr. 20, 2004.

"XMP Adding Intelligence to Media"; XMP Specification; Jan. 2004; 11 pages.

"Controlling the Data Chaos by Adding I*ntelligence to Media"; 4 pages, 2004.

Miller; "An Introduction to the Resource Description Framework"; D-Lib Magazine, May 1998; ISSN 1082-9873; http://www.dlib.org/dlib/may98/miller/05miller.html.; 10 pages.

"@tryinCSS3(was:Useragent Rules in CSS)"; Mar. 31, 2004; http://lists.w3.org/Archives/PUblic/www-style/2004Mar/0333.html.; 2 pages.

"[Editorial Draft] Versioning XML Languages"; Proposed TAG Finding Nov. 16, 2003; http://www.w3.org/2001/tag/doc/versioning-20031116; 23 pages.

"SOAP Version 1.2 Part 1: Messaging Framework"; W3C Proposed Recommendation May 7, 2003; http://www.w3org/TR/2003/PR-soap12-part1-20030507. 25 pages.

Official Notice Of Rejection for China Patent Application No. 200480001329.4 mailed on Nov. 23, 2007, pp. 16.

Eisenberg, et al., "Consensus of Subjective Probabilities: The Pari-Mutuel Method", Annals of Mathematical Statistics, 1959, pp. 165-168.

* cited by examiner

SYSTEMS AND METHODS FOR SUPPORT OF VARIOUS PROCESSING CAPABILITIES

RELATED APPLICATIONS

This application incorporates by reference the entire disclosure of each of the following U.S. Provisional Patent Applications, and claims priority under 35 U.S.C. §119(e) to the following U.S. Provisional Patent Applications, each of which was filed on May 3, 2004:

| Ser. No. | Inventor(s) | Title |
| --- | --- | --- |
| 11/912,794 | Foehr et al. | SYSTEMS AND METHODS FOR PASSING DATA IN A FILTER PIPELINE |
| 10/912,975 | Foehr et al. | SYSTEMS AND METHODS FOR HANDLING A FILE WITH COMPLEX ELEMENTS |
| 10/935,681 | Foehr et. al. | SYSTEMS AND METHODS FOR SUPPORT OF VARIOUS COMPUTER AND PRINTER CAPABILITIES |
| 10/938,476 | Sedky and Emerson et al. | SPOOLING STRATEGIES USING STRUCTURED JOB INFORMATION |
| 10/935,025 | Foehr et al. | PLANAR RENDERING |
| 10/938,357 | Foehr et al. | SHARING OF DOWNLOADED RESOURCES |

TECHNICAL FIELD

The present invention generally relates to computing devices and rendering devices, and more particularly relates to support of various processing capabilities of computing devices and/or rendering devices.

BACKGROUND

The range of functionality available to users of computing devices is ever increasing. From traditional desktop personal computers (PCs) and laptops to tablet PCs and personal digital assistants (PDAs), computing devices may be configured to provide functionality in different environments. Additionally, the range of target entities, and particularly rendering devices, which may be utilized by these computing devices also continues to increase. For example, a computing device configured as a desktop PC may include a display device that provides an output for viewing by a user and a color printer for printing color images to a printable medium.

The computing device may communicate with each of the target entities through use of a respective device driver. A device driver, when executed, is utilized to convert input/output instructions received from the computing device into a form that is compatible with the respective target entity. Likewise, the device driver, when executed, may be utilized to convert responses to the input/output instructions from the respective target entity into a form that is compatible with the computing device. Because of the wide range of computing devices and target entities that are available to users, however, manufacturers of computing devices and target entities are faced with the challenge of deriving device drivers for each particular environment that may be encountered by their products. For example, a manufacturer of a printer may be required to develop a device driver for each particular configuration of computing device that may utilize the printer. Further, each device driver that is developed for a particular computing device may be inflexible in that the device driver is not able to support changing capabilities that may be provided through further development of the computing device and/or the printer. Therefore, a new device driver was traditionally required when additional functionality was added to the computing device and/or the printer.

Accordingly, there is a continuing need for systems and methods that support various computing device and target entity capabilities.

SUMMARY

Systems and methods are described that support various computing device and/or target entity processing capabilities. For example, computing devices and/or target entities may each support various processing capabilities to process data for being rendered. In an embodiment, a plurality of filters is provided, each corresponding to a respective processing capability for processing data for being rendered. The filters may be arranged to form a filter pipeline such that one or more of the filters provides an output, which is then provided as an input to another one of the filters. In this way, the filter pipeline may be formed by arranging the filters, thereby providing a flexible infrastructure to address a variety of functionality that may be provided on a computing device and/or target entity.

The plurality of filters, for instance, may be arranged to form a device driver which is executable to convert input/output instructions from a computing device into a form that is compatible with a target entity, and vice versa. In an implementation, the filters are selected based on the processing capabilities of the computing device to process data for being rendered by the printer. In another implementation, the filters are selected based on the processing capabilities of the rendering device to process data for being rendered by the rendering device. For instance, the rendering device (e.g., a printer) may support particular processing capabilities, such as to convert a color image to black-and-white. Therefore, a device driver may be formed by selecting one or more of a plurality of filters for execution on the computing device that are compatible with the particular processing capabilities of the rendering device. Thus, the plurality of filters may be arranged to take advantage of the particular processing capabilities of the rendering device such that the device driver that is executed on the computing device does not provide redundant functionality. Likewise, one or more filters may be implemented on the rendering device to take advantage of the processing capabilities of a computing device.

By providing the processing capabilities through use of a plurality of filters, the processing workload may be divided between the computing device and the target entity. Continuing with the previous example, the functionality of filters utilized to process data for being rendered by a rendering device may be provided for execution on either the computing device or the rendering device. Therefore, both the computing device and the rendering device may contribute one or more processing capabilities such that the data is processed by both the computing device and rendering device.

The plurality of filters may also be grouped to form various collections that address the different processing capabilities of different respective computing devices and/or target entities. For instance, a computing device may be communicatively coupled to a plurality of printers, each having different processing capabilities, one to another. The computing device may utilize different collections of the plurality of filters based on the processing capabilities of the respective printers. In this way, the different collections of the plurality of filters may each act as a device driver for the respective printers. In another instance, a rendering device may likewise include a plurality of filters to access different processing capabilities of a plurality of computing devices, one to another.

The plurality of filters may also be utilized to support legacy devices. For instance, a device driver may be formed from a plurality of filters. A new rendering device, however, may be encountered which supports functionality that is not supported by the plurality of filters. Therefore, one or more filters may be generated for addition to the plurality of filters such that a new device driver is formed having the one or more additional filters and the plurality of filters. Thus, the new device driver that includes the one or more filters may provide an output that is compatible with the functionality of the new rendering device. Likewise, the functionality of one or more filters may be added to a target entity to address changing functionality of the computing device.

BRIEF DESCRIPTION OF THE DRAWINGS

The same numbers are used throughout the disclosure and figures to reference like components and features.

DETAILED DESCRIPTION

Overview

Figure 1:
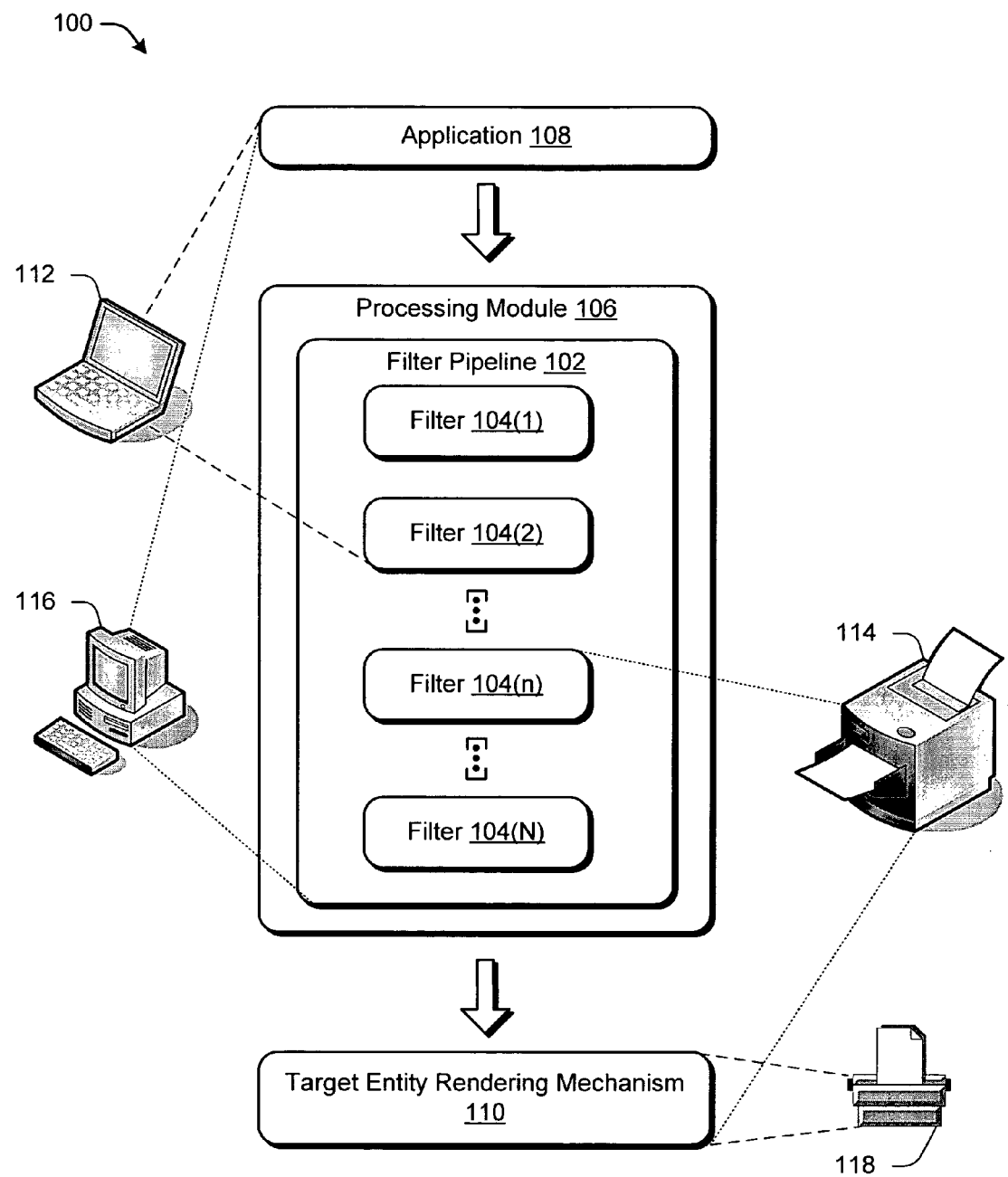
FIG. 1 is an illustration of an exemplary computing environment in which a filter pipeline may be configured and ordered to achieve a variety of desired functionality.

FIG. 1 is an illustration of an environment 100 in an exemplary implementation in which a filter pipeline 102 may be configured and ordered to achieve a variety of desired functionality. The filter pipeline 102 includes a plurality of filters 104(1), 104(2), ..., 104(n), ..., 104(N). Each of the plurality of filters 104(1)-104(N) is configured to provide one or more particular processing functions to generate an output. For example, one of the filters 104(1)-104(N) may provide a watermark, another one of the filters may provide a color conversion, a further one of the filters 104(1)-104(N) may perform a conversion of content from one resolution to another, yet another one of the filters 104(1)-104(N) may process content from one format to another format, and so on. Additional examples of filter functionality may be found in the following discussion starting in relation to FIG. 5. Additionally, the plurality of filters 104(1)-104(N) may be arranged such that an output from one of the filters is provided as an input to another one of the filters. In this way, the filters 104(1)-104(N) of the filter pipeline 102 provide a flexible infrastructure that can be arranged to provide a variety of functionality.

The filter pipeline 102, for instance, may be provided as a processing module 106 that is utilized to process an output of an application 108 such that it may be rendered by a target entity rendering mechanism 110, such as a printing mechanism. The plurality of filters 104(1)-104(N), when taken together, provides device driver functionality. Device drivers are typically implemented as software that is targeted to a particular type of target entity, such as printers, display devices, storage devices, removable media devices, and so forth. The device driver "processes" general input/output instructions into a form that the particular device can understand, and thus may also be referred to as a processing module 106 as illustrated.

In another instance, by forming the processing module 106 as a plurality of filters 104(1)-104(N), a processing workload may be divided between a computing device and a rendering device. For example, a computing device 112 may include an application 108 and filters 104(1), 104(2). A rendering device, illustrated as a printer 114, may include filters 104(n), 104(N) that process the output of filters 104(1), 104(2) such that the target entity rendering mechanism 110 can render the result. Further discussion of arrangement of filters for workload sharing may be found in relation to FIG. 9.

In a further instance, the filter pipeline 102 may also be "tapped" at various points such that a data stream processed by particular filters 104(1)-104(N) is routed to a corresponding device. For example, computing device 116 may include the application 108 and the filter pipeline 102. In other words, computing device 116 includes a version of each of the filters 104(1)-104(N) in the filter pipeline 102. Therefore, the computing device 116 may provide an output to a printer 118 that does not include any of the filters 104(1)-104(N). The computing device 116 may also provide an output from filters 104(1), 104(2) that may be further processed by printer 114 that includes filters 104(n), 104(N). In this way, the processing module 106 may route the data processed by the filters 104(1)-104(N) according to the processing capabilities of the target entities (e.g., printers 114, 118). A further discussion of filters that are individually executable by a rendering device to address differing computing device processing capabilities may be found in relation to FIG. 11.

In yet another instance, the filter pipeline 102 may be utilized to implement a versioning strategy as new processing functionality becomes available. For example, filters that are used to process a new version of a document may be added to the filter pipeline 102 that is configured to process an earlier (e.g., older) version of a document. Therefore, the filter pipeline 102, through addition of the new filter, may process both versions of the document. Further discussion of arrangement of filters for support of a legacy rendering device may be found in relation to FIG. 10.

Exemplary Environment

Figure 2:
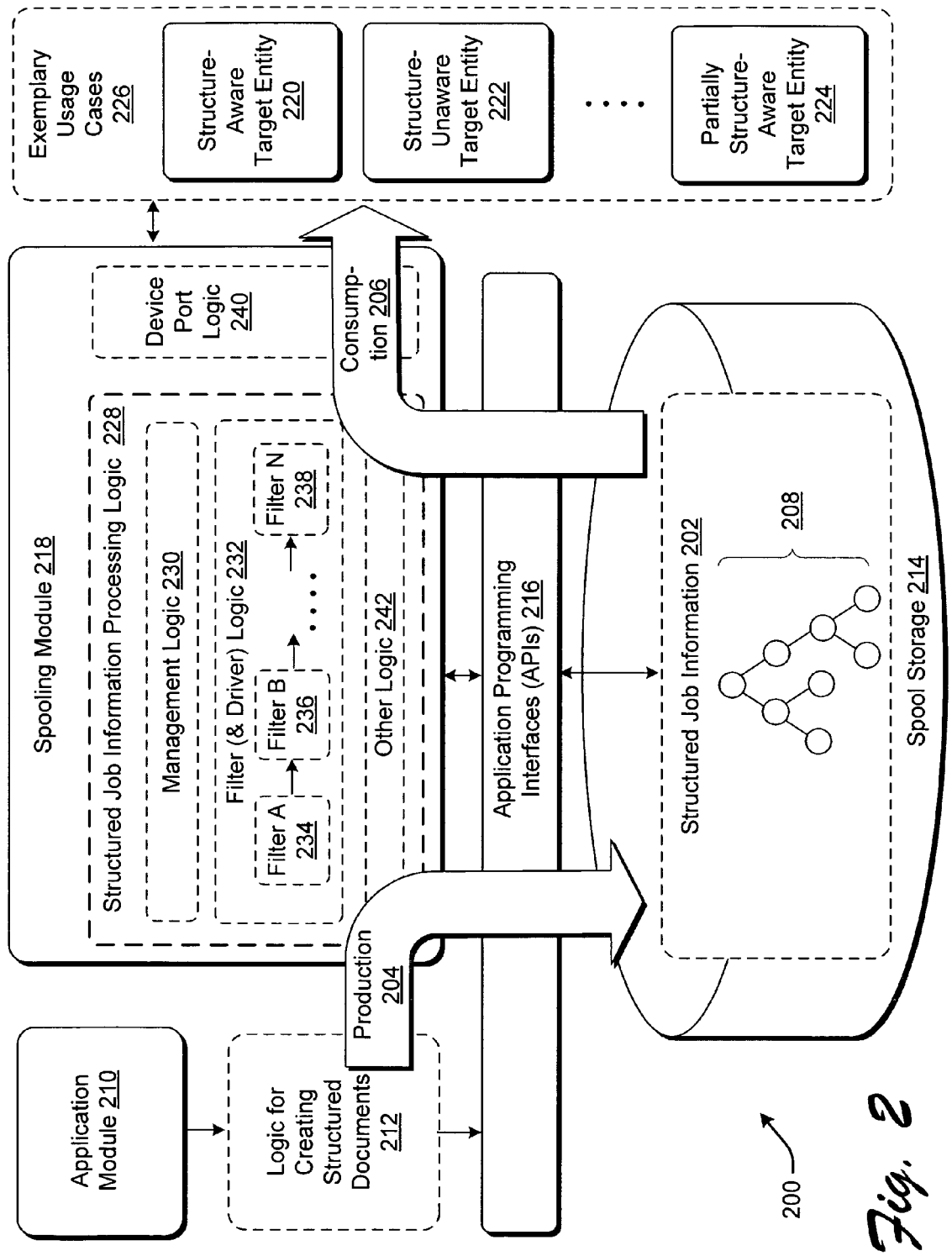
FIG. 2 shows an exemplary system for producing and consuming job information that may employ the filter pipeline of FIG. 1.

FIG. 2 shows an exemplary system 200 for producing and consuming job information 202 that may employ the filter pipeline 102 and the processing module 106 of FIG. 1. The term "job" as used herein refers to a task in which one or more actions are performed to process job information. For instance, a print job may entail printing job information that defines one or more documents. More generally, reference to "processing" job information can refer to any kind of conversion of such job information for rendering, such as printing or displaying such job information. Alternatively, processing can refer to distributing the job information to a target destination (with or without modifying it), archiving the job information, or some other form of processing. The term "job information" refers to any kind of information used to specify the nature of the job, such as the actual information to be rendered, and/or information that defines how the job is to be rendered, and so on. The production of such job information 202 in the exemplary system 200 is generally represented by arrow 204, and the consumption of such job information 202 is generally represented by arrow 206.

As broadly indicated in FIG. 2, the job information 202 includes a defined structure 208. The structure 208 generally includes a plurality of nodes that are connected together according to a set of established rules. The same general rules apply to the construction of the structure 208 regardless of the application and application platform used to generate the job information 202.

In the exemplary case of FIG. 2, the structure 208 uses a hierarchical scheme to connect the nodes together. A hierarchical scheme couples the nodes together using parent-child relationships. That is, a "top-most" node defines a so-called root node. Thus, the use of the terms "top" and "bottom" refer to placement in the hierarchical scheme relative to the root node. The root node includes one or more child nodes, and the child nodes, in turn, can include one or more of their own respective child nodes, and so on. If so configured, child nodes can generally inherit properties associated with their respective parent/ancestor nodes.

Generally, the structure 208 is a logical concept that may or may not map to actual parts of a document to be rendered. That is, each node may be considered an object. Certain objects may represent actual parts of a document to be rendered (such as various image resources and font resources). Other objects may not have a one-to-one relationship with parts of the documents to be rendered. These latter types of nodes are therefore analogous to folders in a file hierarchy; that is, the folders may store individual files that contain content that maps to actual parts of the document, but the folders themselves may not have a one-to-one relationship with actual parts of the document.

The production and consumption aspects (204, 206) of the processing of job information 202 will be addressed separately below. First, by way of overview, the system 200 includes an application module 210 and conversion logic 212 that has access to a spool storage 214 via application programming interfaces (APIs) 216. The spool storage 214 stores the job information 202. This chain of components implements the production aspects (204) of the processing of the job information 202.

Spool storage 214 represents storage for storing job information implemented using any physical storage medium. In one case, a device may implement the spool storage using RAM memory. In another case, the device may implement the spool storage using disk storage, and so on. The spool storage may define a single file, a collection of associated files, or some other storage strategy. A unit of spool storage (such as a single file) that stores an entire package defining a job is also referred to as a "container." Alternatively, the spool storage can refer to transitory information transmitted via a communication channel and inherently stored on that channel during transport The system 200 also includes a spooling module 218 that is configured to retrieve the job information 202 from the spool storage 214 and process the job information 202 to provide an output result. This chain of components implements the consumption (206) aspects of the processing of the job information 202, and thus may correspond to the processing module 106 of FIG. 1. Processing can refer to any kind of action performed on the job information 202, which may or may not modify the content of the job information 202. The processing may include printing the job information 202, displaying the job information 202, routing the job information 202 to a target location (with or without modifying it), archiving the job information 202, and so on. In any case, the recipient of the output result generated by the spooling module 218 can include one or more of the target entities (220, 222, . . . , 224) associated with different usage cases 226. A variety of the usage cases 226 will be discussed below.

The modules, logic and storage units shown in the system 200 can be implemented by any variety and grouping of physical mechanisms and devices. In one exemplary case, a computing device executes the application module 210, the conversion logic 212, the APIs 216, the spool storage 214 and the spooling module 218. More specifically, the various logic and modules (210, 212, 216, 218) can be implemented by machine readable code that is storable in the memory of the computing device and executed by a processing unit(s) of a computing device. As previously described, the spool storage 214 can be implemented by a storage medium (e.g., hard disk) provided by the computing device. The computing device can operate using any kind of platform (e.g., as defined by the operating system and/or other software configuration of the computing device). In other words, in one implementation, the functionality and associated formats to be described below are specifically configured to operate on different computing platforms, thus defining a standard approach that has wide applicability to different technical environments and which thus serves to facilitate interaction among different technical environments and associated users.

In one case, the target entities (220, 222, . . . , 224) can be implemented as devices which are separate from the computing device which implements the other components (210-218) of the system 200. The computing device can be communicatively coupled to the target entities (220, 222, ..., 224) via any kind of communication channel, such as a USB coupling, a parallel coupling, a removable media coupling, a network coupling of any kind, and so forth. In a common case, for instance, one or more of the target entities (220, 222, ..., 224) are configured as rendering devices for rendering documents, such as printers for printing documents that are provided by the spooling module 218. The computing device can be communicatively coupled to the printer(s) via any kind of hardwired and/or wireless links using any kind of communication protocol. The target entities (220, 222, ..., 224) can alternatively represent display devices, storage devices, other computing devices, and so on.

The above allocation of system 200 functions to particular devices is only exemplary. In other implementations, different aspects of the system 200 can be implemented by separate computing devices. For instance, a first computing device can implement the application module 210 and a separate computing device can implement the spooling module 218. In other implementations, the spool storage 214 can also be implemented as a separate unit which couples to the computing device which implements the application module 210 and/or the spooling module 218. In other implementations, the target entities (220, 222, ..., 224) can be integrated into the same computing device which implements the application module 210 and/or the spool module 218. Still other configurations are possible, examples of which are illustrated throughout the present description.

In any event, where one or more computing devices are used to perform aspects of the system 200, those computing devices can correspond to any type of computing devices, such as general purpose computing devices (e.g., desktop PCs), application-specific computing devices (e.g., game consoles), portable computing devices (e.g., personal digital assistants and mobile phones), and so on.

Further details regarding each of the above-identified components of the system 200 will follow. Beginning with the production aspect (204) of the system 200, the system 200 can use any kind of application module 210 to generate any kind of job information 202, typically associated with any kind of document. Common types of application modules 210 include text processing programs, spreadsheet processing programs, graphics processing programs, markup language processing programs, database search and retrieval programs, and so on. There is no constraint on the type of application module that can be used to supply job information 202 to be processed using the system 200.

Conversion logic 212, in association with APIs 216, ensures that the job information sent to the spooler storage 214 has the required structure 208. In one case, the application module 210 can itself supply the conversion logic 212 as part of its tools. In another case, the system 200 may employ a separate module to implement the conversion logic 212. In this case, different commercial providers can supply the application module 210 and the conversion logic 212. The specific nature of the transformations performed by the conversion logic 212 is dictated by the prescribed format of the structure 208. The forthcoming explanation of the format of the structure 208 will also provide detail regarding the nature of the transformation performed by the conversion logic 212 (if, in fact, any transformation is required). Alternatively, or in addition, the spooling module 218 can play a role in the generation of the job information 202 having the required structure 208.

APIs 216 define one or more interfaces for facilitating interaction among the components shown in the system 200. For example, the APIs 216 facilitate the storage of job information 202 in the spool storage 214 and the subsequent retrieval of the job information 202 from the spool storage 214. More specifically, exemplary and non-limiting functions performed by the APIs 214 can include: (1) submitting job information 202 to the spooling module 218 for scheduling and printing; (2) querying the state of the job while in the spooling module 218; (3) monitoring different stages of the job production and hooking up to back end notifications to inform any interested listening entities; (4) monitoring different stages of the job consumption and hooking up to back end notifications to inform any interested listening entities; (5) enabling the spooling module 218 to send output data to the target entities (220, 222, 224), and so on. Job information can be supplied to and retrieved from the spool storage 214 in a number of different modes, such as, for example, a streaming mode. In a streaming mode, portions of the job information are stored or processed in piecemeal fashion as it is being received.

The APIs 216 can generally be implemented as a plurality of methods and properties. In the context of an object-oriented programming paradigm, the APIs 216 can be defined by a collection of classes which specify such methods and properties.

With respect to the consumption (206) aspect of the system 200, the system 200 retrieves the resource information 202 from the spool storage 214 and supplies it to the spooling module 218 for processing. The spooling module 218 can represent a software program implemented by the same computing device that provides the application module 210. It includes processing logic 228 for processing the job information 202. This processing logic 228, in turn, can include management logic 230 for governing various operations performed by the processing logic 228. As previously described, the spooling module 218 relates to the consumption 206 aspects of the system 200, and therefore may correspond to the processing module 106 of FIG. 1.

The processing logic 228 can also include filter logic 232 for actually performing the required processing on the job information 202. As will be described in greater detail below in relation to FIG. 5, the filter logic 232 can include one or more filters (234, 236, ..., 238) for performing different processing functions on the job information 202 to generate an output result. The spooling module 218 then feeds the final output result to one or more of the target entities (220, 222, ..., 224) via a device port logic 240. Although illustrated separately, the device port logic 240 may be implemented as one or more of the filters 234-238. In the common case of printing, one or more of the target entities (220, 222, ..., 224) include a printer which receives the output result and prints the document(s) specified by the output result. Finally, the spooling module 218 can also include generically-labeled other logic 242 for performing other related and unrelated functions.

Further details regarding the filter logic 232 are provided as follows. In one implementation, the job information 202 that is processed by one or more of the filters (234, 236, ... 238) has the same format structure 208 as the job information 202 stored in the spool storage 214. Thus, in this exemplary implementation, the filter logic 232 does not require that the job information 202 be converted into an intermediary form in order to process it. This, in turn, enables the spooling module 218 to process job information 202 in a more efficient manner compared to those techniques that require such conversion. This also yields a more uniform approach compared to some other techniques, which may resort to a complicated assortment of disparate and ad hoc processing techniques to deal with different proprietary formats that can be used to store job information in the spooler storage 214.

The functions performed by the individual filters (234, 236, ..., 238) can be generalized in the following manner. A first class of filters accepts job information 202 which conforms to the structure 208, performs some kind of processing on this information 202 (which may or may not modify the information 202), and then generates an output result which also conforms to the structure 208. A second class of filters accepts job information 202 which conforms to the structure 208, performs some kind of processing on this information 202, and then generates an output result which does not conform to the structure 208 (or which only partially conforms to the structure 208). A third class of filters accepts job information 202 which has already been converted into a non-structured format, and provides yet further modification or processing of such non-structured information.

More specifically, for example, one or more initial filters of the first class can be set up to process the job information 202 in various ways (e.g., by adding a watermark, and so on), but do not otherwise change its basic format structure 208. A terminal filter of the second class can be set up to process the job information 202 by changing its format, such as by either completely removing its format structure 208 or at least partially modifying its format structure 208. More specifically, the terminal filter (e.g., filter N 238) can be used to convert job information 202 having the format structure 208 into a non-structured form that can be interpreted by an identified target entity (220, 222, ..., 224). In effect, the filters (234-238), when taken together, thus serve the role of a device driver. For instance, filter N 238 may convert the job information 202 having the structure 208 into a page description language (PDL) format that can be fed to a printer which accepts such format.

Suppose, as explained above, that the terminal filter N 238 is a filter of the first class which generates an output result having job information 202 which still conforms to the structure 208. A target entity 220 represents an appropriate device to receive such an output result. This target entity 220 is referred to as "structure-aware" because it receives job information 202 conforming to the structure 208 and thus includes processing functioning to recognize such information 202 and process it appropriately.

Suppose, alternatively, that the terminal filter N 238 is a filter of the second class or third class which generates job information which no longer conforms to the structure 208. A target entity 222 represents an appropriate entity to receive such an output result. This target entity 222 is referred to as "structure-unaware" because it receives job information 202 that no longer conforms to the structure 208, and thus the entity 222 does not need to devote any specialized functionality for processing information expressed in this structure 208; indeed, the target entity 222 need not, and generally will not, be aware that the job information 202 its receives (e.g., in an appropriate PDL format) was ever originally expressed using the structure 208.

There is a third case where the terminal filter N 238 generates an output result which modifies the structured format 208 to some extent, but still maintains some vestiges of the structure 208. Target entity 224 is an example of a kind of entity that can receive and processing this output result. FIG. 2 identifies this kind of entity 224 as being "partially structure-aware" because it should include at least some processing functionality for interpreting whatever remnants of the structure 208 that still remain in the output result.

Different jobs may require that different filtering operations be performed on the associated job information 202. The filter logic 232 can be used to define what filters (234, 236, ..., 238) are to be invoked in processing a particular job, how the individuals filters (234, 236, ..., 238) are to be configured, and how the filters (234, 236, ..., 238) are to be chained together. In other words, the filter logic 232 can select and chain the filters (234, 236, ..., 238) together in different ways to produce different net effects. In a series configuration shown in FIG. 2, for example, filter A 234 feeds its output result into the input of filter B 236, and filter B 236 feeds its output result into to the input of another filter, and so on.

More specifically, the type of processing that the filter logic 232 performs on the job information 202 can be controlled, in part, by one or more "print tickets" associated with the job information 202. The print tickets include attribute information that defines the operations that should be performed on the job information 202 as it passes through the filter logic 232. Different print tickets can be associated with different parts of the structure 208 of the job information 202. For instance, a print ticket can be associated with the root of the structure 208, so as to globally apply print instructions to the entire job. A print ticket can be associated with another node farther down in the hierarchy of the structure 208 to apply more localized print instructions with respect to some part of the job. For example, this feature allows different processing rules to be assigned to two different pages of a single print job, or different parts of a single page, and so on.

Figure 3:
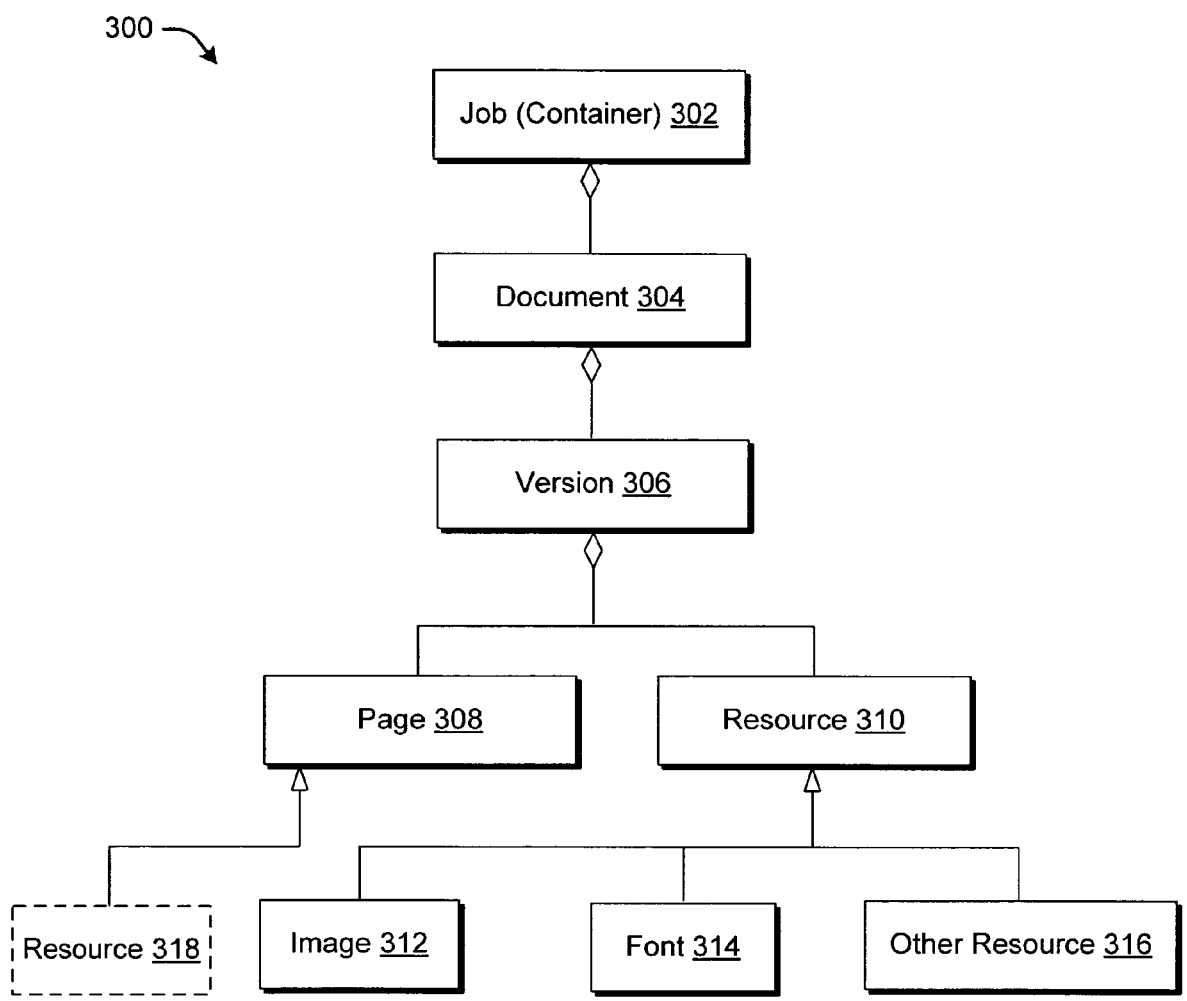
FIG. 3 shows an exemplary schema that can be used to form job information having a structure shown in FIG. 2.

FIG. 3 shows an exemplary schema 300 that can be used to form the job information 202 having the structure 208 shown in FIG. 2. The schema 300 defines a way of arranging job information 202 originally provided by the application module 210 (e.g., in the form of documents generated by the application module 210) into the hierarchical structure 208. As mentioned above, the conversion logic 212 in association with the APIs 216 can perform this conversion task, or the application module 210 itself can output job information 202 which is already persisted in the structured format 208. The spooling module 218 and/or the processing logic 106 of FIG. 1 can also play a role in generating the required format structure 208.

The top level of the hierarchy specifies job-related information 302 that identifies the entire job itself. For instance, the job may pertain to the printing of a book including multiple chapters, and each chapter, in turn, can include multiple pages, and each page, in turn, can include font resources and image resources. In this example, the top level of the hierarchy identifies a logical package which encapsulates the entire job, that is, the entire book. A "package" is a logical concept that refers to a collection of job information that comprehensively specifies an entire job. The package can contain multiple "parts" which are provided in differing levels of the hierarchy. A "payload", for instance, corresponds to a collection of parts treated as a single unit, and which satisfies certain characteristics. For instance, a package may specify multiple payloads that respectively define different versions of a single document, and each of these payloads can contain multiple parts (e.g., image resources, font resources, and so forth).

A next level of the hierarchy specifies information 304 that identifies the documents associated with the job. In the example of the book, the document level might specify individual chapters in the book. Or this level of the hierarchy may specify different kinds of documents to be printed in a single print job, such a first document created using a text editor, and a second document created using a spreadsheet program, and so on, where these two documents together form a report of some kind. The next level of the hierarchy specifies information 306 that identifies different versions of the documents identified in the preceding level. For instance, consider the case of a chapter of a book. This chapter can be specified in a first version that requires that the chapter be printed in a black and white mode, and a second version that requires that the chapter be printed in a color mode. Or different versions may correspond to different languages used to present information in the document, and so on. Depending on configuration information and other factors, the spooling module 218 or other processing logic can select an appropriate one of the versions to process and present to an appropriate target entity (220, 222, . . . , 224). The next level of the hierarchy specifies information 308 that identifies different pages within the versions of the documents identified in the proceeding level.

Resources can be associated with any level of the hierarchy defined by schema 300. For instance, exemplary resource 310 can be associated with the versions level of the hierarchy. Such resource 310 can comprise an image resource 312, a font resource 314, or some other resource 316. Resource 318, on the other hand, is associated with the page level of the hierarchy, rather than version level. FIG. 3 is exemplary and non-limiting; for instance, resources can be associated with yet additional levels in the hierarchy, although not shown in FIG. 3.

Further, although not shown in FIG. 3, metadata can be associated with any of the levels of the hierarchy of the schema 300. Metadata specifies any supplemental information pertaining to the job information 202, such as an author who created a document contained in the job, a time when the document was created, and so on. There are no restrictions on the type of, and meaning assigned to, metadata that can be appended to different parts of the schema 300.

In the same manner, print tickets can be associated with any level of the hierarchy of the schema 300. Print tickets define the types of processing operations that should be performed on associated parts of the hierarchy. For instance, a print ticket associated with the job container level 302 will apply to the entirety of the package defined by the job information 202. A print ticket associated with an individual page of the job information 202 will have a localized effect by only affecting that page.

In general, if so configured, lower levels of the hierarchy defined by the schema 300 can inherent the properties defined in higher levels. In other words, if so configured, a child object in the hierarchy will inherit the properties defined for its parent and ancestors. This means that, if so configured, a print ticket, resource, or metadata associated with a parent node can also be, through inheritance, available to its associated child nodes.

In summary, the schema 300 shown in FIG. 3 provides a powerful, uniform and versatile mechanism for representing complex job information, particularly for those jobs that involve multiple documents and/or multiple versions of documents. Traditional techniques provide no provisions for representing these kinds of complex scenarios in spool storage; therefore, these traditional techniques suffer from the inefficiencies described above, which can be significant.

Figure 4:
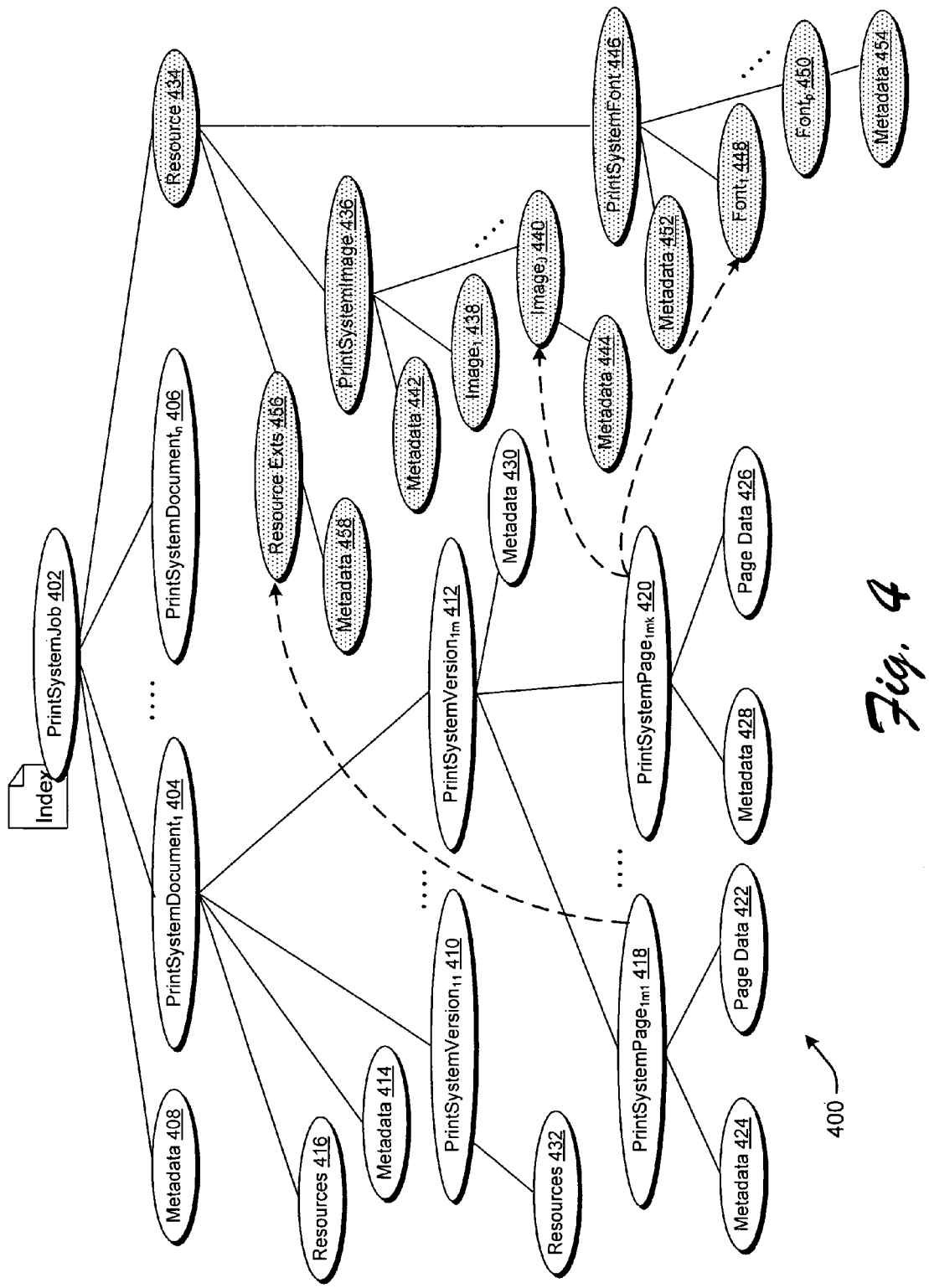
FIG. 4 shows an exemplary instantiation of the schema of FIG. 3.

To further clarify the exemplary schema 300, FIG. 4 shows one exemplary instantiation 400 of the schema 300. The entire collection of nodes shown in FIG. 4 defines a package. The package includes a root node 402 associated with the entire package, e.g., the entire job. An index can be associated with the package, and hence with the root node 402. This index can be used to locate the package in the spool storage 114.

The job defined by the root node 402 includes a number of documents, as identified by document node 404 and document node 406. Also, a metadata node 408 is associated with the root node 402. If so configured, the metadata associated with this metadata node 408 defines properties which apply to the job as a whole.

Each of the documents associated with nodes 404 and 406 can include multiple versions associated therewith. For example, the document represented by node 404 includes at least two versions identified by nodes 410 and 412. As explained in connection with FIG. 3, a document may allocate separate versions for printing a document in black and white mode, color mode, and so on. No limitation is placed on what a developer may define as a version in the context of a particular application environment.

By virtue of the above-identified provisions, the job information 202 having the structure 208 serves as a general blueprint from which many versions can be generated. In general, the specification of such version information within the spool storage 214 itself is a particularly unique and beneficial feature. For instance, this provides an efficient mechanism for printing different versions of the same document without having to store entire separately-tailored copies of the same document in the spool storage 214. Storing separate copies may overwhelm the storage and processing resources of the printing subsystem.

In addition to version nodes (410, 412), node 404 also includes nodes 414 and 416 associated therewith. Node 414 specifies metadata associated with node 404 and node 404 specifies a resource associated with node 404. A resource can include an image resource, a font resource, or some other resource that goes into the composition of the document represented by node 404.

Each version includes one or more pages associated therewith. Nodes 418 and 420, for example, represent pages associated with version node 412. Metadata node 430 indicates that metadata can be associated with the version level of the hierarchy (as it can for any level). Resource node 432 indicates that resource information can be associated with the version level (as it can for any level).

Finally, each page can include page data associated therewith as well as metadata. For example, page node 418 includes page data node 422 and metadata node 424 associated therewith, indicating that page data and metadata can be associated with this page. Page node 420 includes page data node 426 and metadata node 428 associated therewith, indicating that page data and metadata can be associated with this page.

The package associated with root node 402 can also include a collection of resources for shared use by different nodes in the job. Such collection of resources thus defines a shared library of resources that can be applied at different points within a document represented by the package. Particular types of resources include image resources, as represented by general image node 436. Individual image nodes (438, 440) are children of the parent image node 436, and respectively represent individual image resources. A metadata node 442 depends from the general image node 436, which represents metadata that, if so configured, applies to all of the image resources. Another metadata node 444 depends from an individual image node 440, representing metadata that applies to only this image resource associated with this node 440.

The same structure applies to font resources. A general font node 446 represents the inclusion of a plurality of font resources to select from, indicated by font nodes 448 and 450. Metadata can be associated with the general font node 446, as indicated by metadata node 452, or can be associated with a particular font resource, as indicated by metadata node 454. If so configured, metadata associated with the general font node 446 applies to all font resources while metadata associated with a particular font resource (such as found resource 450) applies only to that particular font resource.

The resources can also include a number of other types of resources, as generally indicated by resource node 456. Metadata can be associated with this node 456, as indicated by metadata node 458.

Any document-related node in the package can reference any reference node, indicating that a particular part or aspect of the document is referencing a particular resource for use thereat. For instance, in the exemplary case of FIG. 4, page node 418 references resource extensions node 456. This association is indicated with a dashed line. This means that the resource represented by node 456 is used in the page represented by page 418. Further, page node 420 is associated with image node 440 and font node 448, indicting that an image resource associated with node 440 and a font resource associated with node 448 are used in the page associated with node 420. These associations are indicated by two respective dashed lines.

The hierarchies shown in FIGS. 3 and 4 can be created in different ways. The hierarchy itself is a logical entity, where the nodes correspond to respective objects. Objects can reference other objects in different ways. In one technique, the individual objects can be modified so that they point to linked objects. Linking can be provided by pointers, Uniform Resource Locators (URLs), or some other referencing mechanism. Alternatively, or in addition, separate relationship information can be defined that specifies how separate objects are linked together. This mechanism eliminates the need for individual objects to be modified to define their interrelationship to other objects. This separate relationship information thus serves a blueprint for linking together separate objects in the job information. Likewise, metadata can be associated with individual nodes in the hierarchical structure in different ways. For instance, individual nodes can provide linking information that points to associated metadata, or the objects themselves can embeds such metadata. The Extensible Markup Language (XML), or other markup language, can be used to create the structured format shown in FIGS. 3 and 4.

As noted above, the nodes shown in FIG. 4 are logical entities. Mapping rules define how the nodes map to actual physical entities used to constitute a document that is to be rendered. In one case, some of the nodes directly correspond to parts that are to be rendered, such as image resources and font resources. In another case, other of the nodes do not map, in one-to-one fashion, to actual renderable content of the document, but rather serve to communicate the organization of content in the document, or other aspect of the document.

Figure 5:
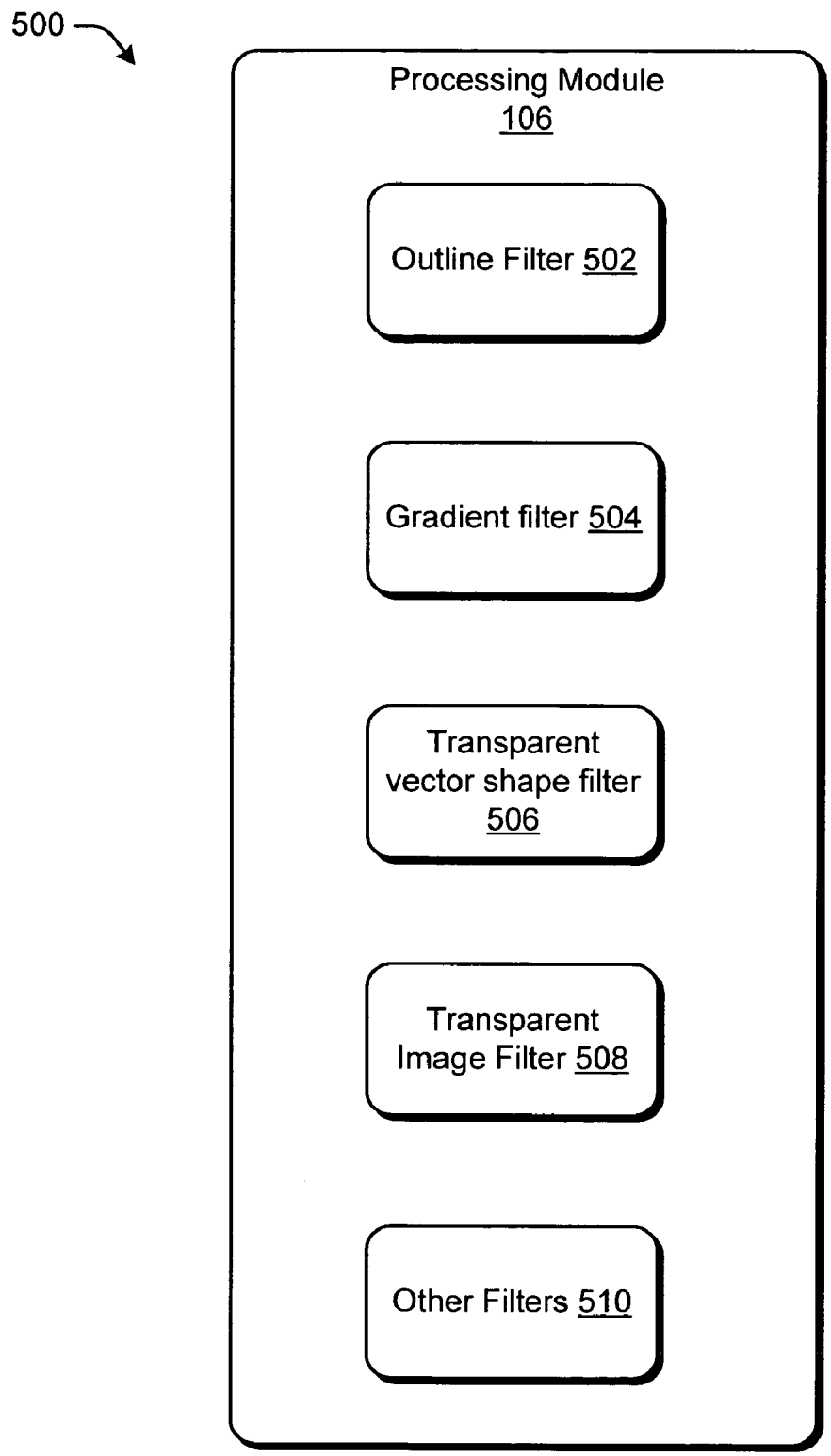
FIG. 5 is an illustration in an exemplary implementation showing a processing module of FIG. 1 in greater detail.

FIG. 5 is an illustration in an exemplary implementation 500 showing the processing module 106 of FIG. 1 in greater detail. The processing module 106 includes a plurality of filters 504-512. A file package, as previously described, may include complex elements that cannot be readily printable by a legacy printer, such as a structure unaware target entity 222 of FIG. 2. The processing module 106 (e.g., spooling module 218 of FIG. 2) may be configured to process the file package and send data that is usable by a legacy printer to print the file.

For example, the plurality of filters 502-510 of the processing module 106 are arranged to form a filter pipeline, such as the filter pipeline 102 of FIG. 1. Each of the filters 502-510, for instance, may be configured to process complex elements in a file that cannot be effectively processed by a legacy printer into simpler elements that the printer can efficiently print. Outline filter 502, for instance, is configured to process elements with complex outlines. Outline filter 502 is executable to process a complex outline of a graphical element into a simple primitive(s) that can be handled by a legacy printer. Simple primitives may include lines, polygons, areas, vector shape elements, and the like.

Gradient filter 504 is configured to process elements with complex gradients. Gradient filter 504, for instance, is executable to process a complex gradient into multiple polygons with fill colors that approximate the gradient, convert the gradient into a series of bitmaps, and so on.

Transparent vector shape filter 506 is configured to process vector shape elements with transparency functionality. As previously described, a first graphical element that supports transparency functionality (e.g. alpha value less than one) allows a second graphical element that is overlapped by the first graphical element with transparency to be partially shown. The region of the second graphical element covered by the first graphical element (i.e. overlapping portion) may therefore have a color that is "between" the colors of the first and second graphical elements. For example, if the transparency value is high (i.e., an alpha value is set closer to 1.0 such that the graphical element is more opaque), the color of the overlapping portion will be closer to the color of the element with transparency (i.e., the first, overlapping graphical element). If the transparency value is low (i.e., an alpha value is set closer to 0.0 such that the graphical element is more transparent), the color of the overlapped region will be closer to the color of the overlapped element (i.e., the second graphical element). Transparent vector shape filter 506, for instance, may be executed to process the transparency element and the overlapped element into two new elements with solid fill colors but without the overlapped region. Transparent vector shape filter 506 may also create another new element with for the overlapping portion with a solid fill color that approximates the original overlapping portion.

Transparent image filter 508 is configured to process image elements with transparency. Transparent image filter 508 determines the overlapping region of image elements and creates a new image element that approximates the overlapping region using shape elements and other image elements. Transparent image filter 508 is configured to apply alpha computation and subsequent clipping to polygonal paths. It is to be appreciated that transparent vector shape filter 506 and transparent image filter 508 are separately discussed in this document for clarity reasons. In an implementation, both filters may be combined into a single filter.

Processing module 106 may include other filters for performing other processing steps. For example, processing module 106 may include a filter to convert file data to information that a legacy printer can understand, such as page description language (PDL) command streams. Processing module 106 may also include filters that are not configured to modify file data. For example, processing module 106 may include a filter that sends a copy of the file data to an archive.

It is to be understood that filters 502-510 are modularly configured and form a filter pipeline where the output of one filter is served as the input of another filter. The modular configuration enables different filters to be easily added, modified or removed. The filter pipeline enables a file to be converted efficiently to a format understood by a legacy printer. This capability allows processing module 106 to provide a file to a legacy printer for printing without converting the complex elements in the file to computationally-intensive pixel-based elements, such as rasterized graphical elements (e.g., bitmaps).

Filter Pipeline

Figure 6:
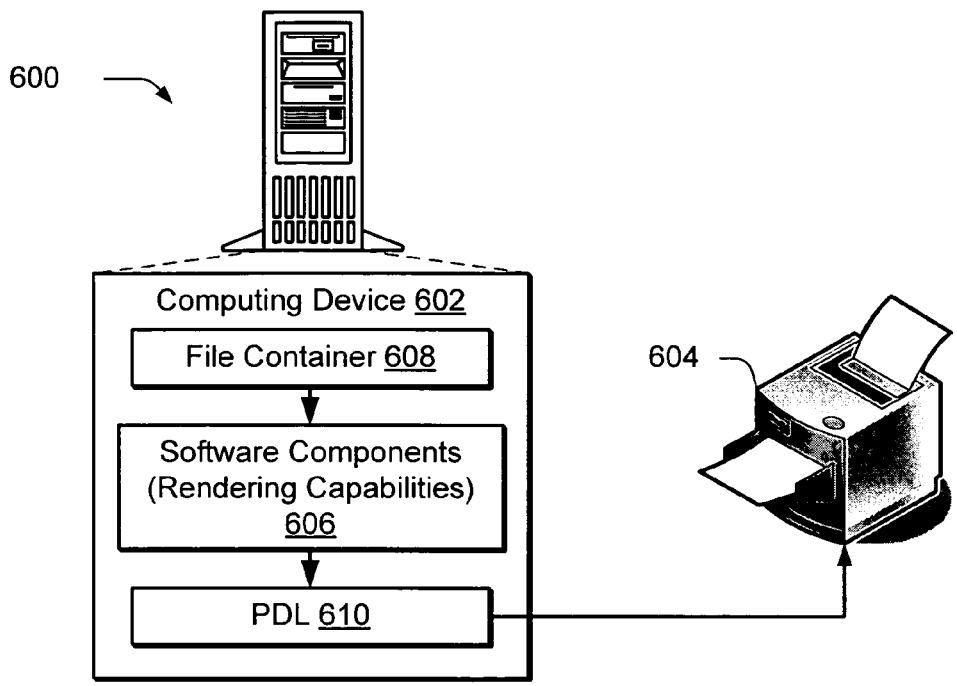
FIGS. 6, 7, and 8 are illustrations of systems in exemplary implementations showing computing devices and target entities depicted as printers, each of the devices have differing processing capabilities that are configured to interact, one to another.
Figure 7:
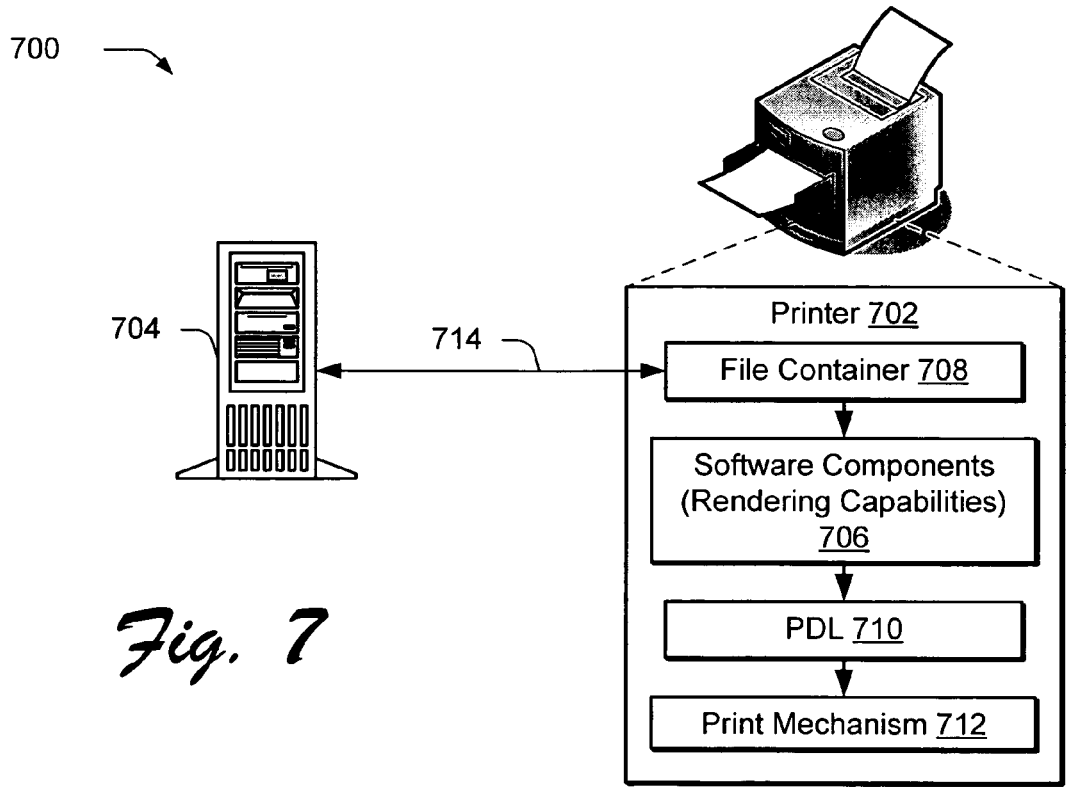
Figure 8:
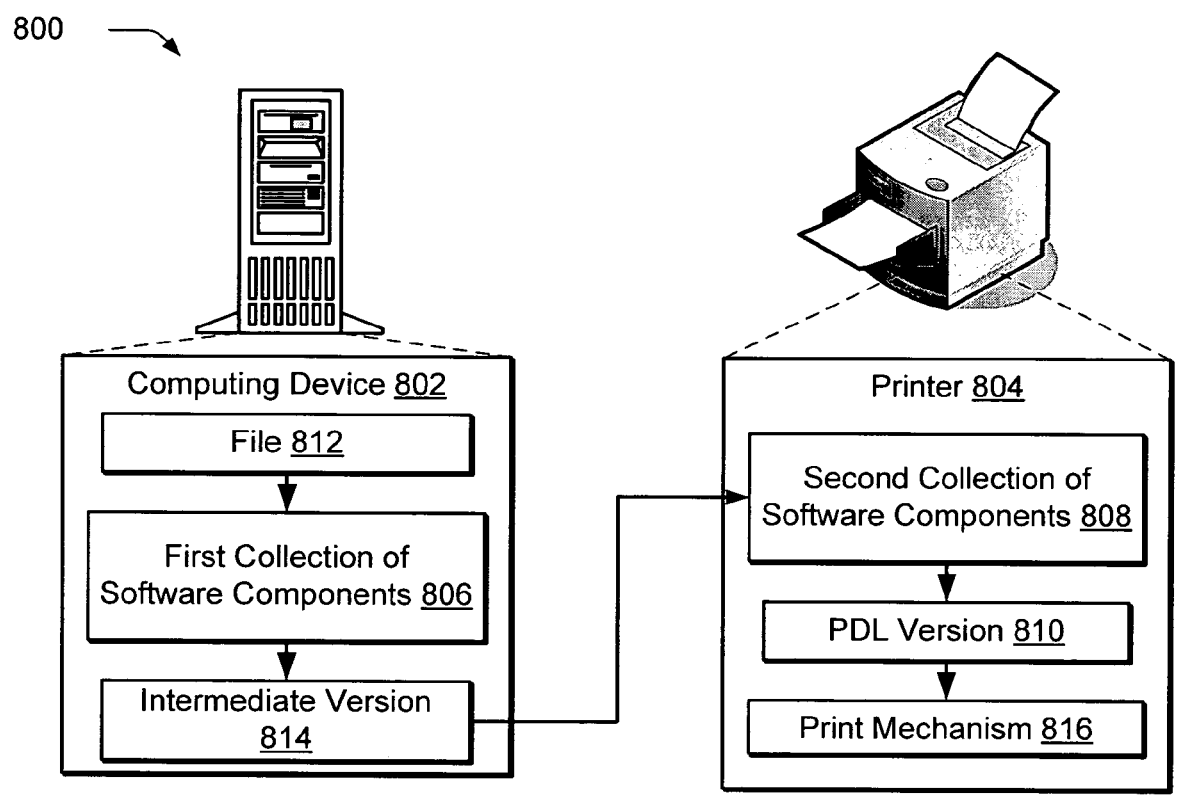

FIGS. 6, 7, and 8 are illustrations of systems 600, 700, 800 in exemplary implementations in which computing devices and rendering devices (which in these instances are illustrated as printers) each have differing processing capabilities and are configured to interact, one to another, through use of a filter pipeline. In the following discussion, although rendering is described in the context of printing a file by using a printer, a variety of other rendering techniques may be employed, such as through use of display devices, tactile response devices, and so forth.

Generally, any of the functions described herein can be implemented using software, firmware (e.g., fixed logic circuitry), manual processing, or a combination of these implementations. The terms "module," "functionality," and "logic" as used herein generally represents software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of the filter pipeline strategies described below are platform-independent, meaning that the filter pipeline strategies may be implemented on a variety of commercial computing platforms having a variety of processors. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth.

A set of processing capabilities may be provided through the use of software and hardware components to ensure that the file is rendered as intended. For example, a computing device and a printer may provide a system for processing and rendering a file having an electronic drawing. The system includes software components having processing capabilities to convert the drawing from a native format to a page description language (PDL), which may include providing digital rights management (DRM), page ordering, and so on, such that the file may be rendered by a rendering device. These processing capabilities, provided through execution of corresponding software components, may be divided between the computing device and the printer in a variety of ways.

In the first system 600 depicted in FIG. 6, the processing capabilities are provided on the computing device 602, which is illustrated as a desktop PC that is communicatively coupled to a printer 604. The printer 604, in this instance, only understands a particular PDL that does not match the original application file format. Therefore, the computing device 602 in this example includes each of the software components 606 having processing capabilities that are utilized to process (e.g., convert) a file container 608 to a PDL 610 representation of the file container 608. In other words, the PDL 610 is a converted form of the file container 608 such that the printer 604 can render the contents of the file container 608 as intended. Thus, the computing device 602 provides an output of the PDL 610 which causes the printer 604 to render the data described therein. In this instance, the printer 604 is a structure-unaware target entity 222 as described in relation to FIG. 2.

In the second system 700 depicted in FIG. 7, the processing capabilities are provided on the printer 702, such as a "thick" or "intelligent" printer having significant hardware and software resources that together provide the processing capabilities. In such an instance, the computing device 704 merely communicates the file container to the printer 702 for processing without performing conversions, DRM, and the like. Thus, the printer 602 is a structure-aware target entity 220 as described in relation to FIG. 2.

The printer 702, for instance, may include software components 706 that convert a file container 708 to a model-specific PDL 710 representation of the file container 708. The model-specific PDL 710 may then be utilized by the software components 706 to cause the printing mechanism 712 to print the PDL 710 representation of the file container 708 on a printable medium.

The system 700 of FIG. 7 may be considered a general opposite of the system 700 of FIG. 7. In the system 700 of FIG. 7, the printer 702 is a structure aware target entity (e.g., the structure aware target entity 220 of FIG. 2), and thus may be considered "intelligent" in that it has considerable hardware and/or software capabilities that enable the printer 702 to process and render data.

In the illustrated implementation, the printer 702 has a bidirectional interface 714 that provides bidirectional communication back to the computing device 704. For instance, the printer 702 may utilize the bidirectional interface 714 to gather additional information or resources (e.g., from the Internet, and so on) that are utilized to process and render the file container 708.

In the third system 800 of FIG. 800, the processing capabilities are divided between the computing device 802 and a printer 804. Therefore, unlike in the previous examples (e.g., the first and second systems 600, 700) where the rendering capabilities were generally provided by either the computing device or the printer, the processing capabilities in the third system 800 are provided by both the computing device 802 and the printer 804.

The computing device 802, for instance, may include a first collection 806 of software components having the functionality of a "light" printer driver in that, the software components in the first collection 806 do not provide a model-specific PDL output. The printer 804 includes a second collection of software components 808 that accepts the output of the first collection 806 from the computing device 802. The printer 804 may then execute the second collection of software components 808 to produce rendering instructions 810 of a file 812 from the computing device 802.

The computing device 802 of FIG. 8 is illustrated as having a file 812 for output. The file 812 is processed by the first collection of software components 806 to form an intermediate version 814 of the file. The computing device 802 then communicates the intermediate version 814 of the file 812 to the printer 802. The printer 802, upon receipt of the intermediate version 814 of the file 812, executes the second collection of software components 808 to convert the intermediate version 812 of the file 812 to specific rendering instructions 810 for the file. The rendering instructions 810 are suitable for causing the printing mechanism 816 to print the file 812, i.e. for rendering the PDL version of the file 812. Thus, the third system 700 is a "middle ground" in the spectrum between the first and second systems 600, 700 of FIGS. 6 and 7, respectively. In this instance, the printer 804 is a partially structure-aware target entity 224 as described in relation to FIG. 2.

By employing the system 800 of FIG. 8, device and software manufactures may negotiate which processing capabilities are to be provided on the respective devices. In an implementation, this negotiation may be provided dynamically by software modules that are executed on the computing device and/or the printer. In another implementation, the negotiation may be performed by a developer and the result of the negotiation provided as a driver for corresponding devices.

Filter Hierarchies

Figure 9:
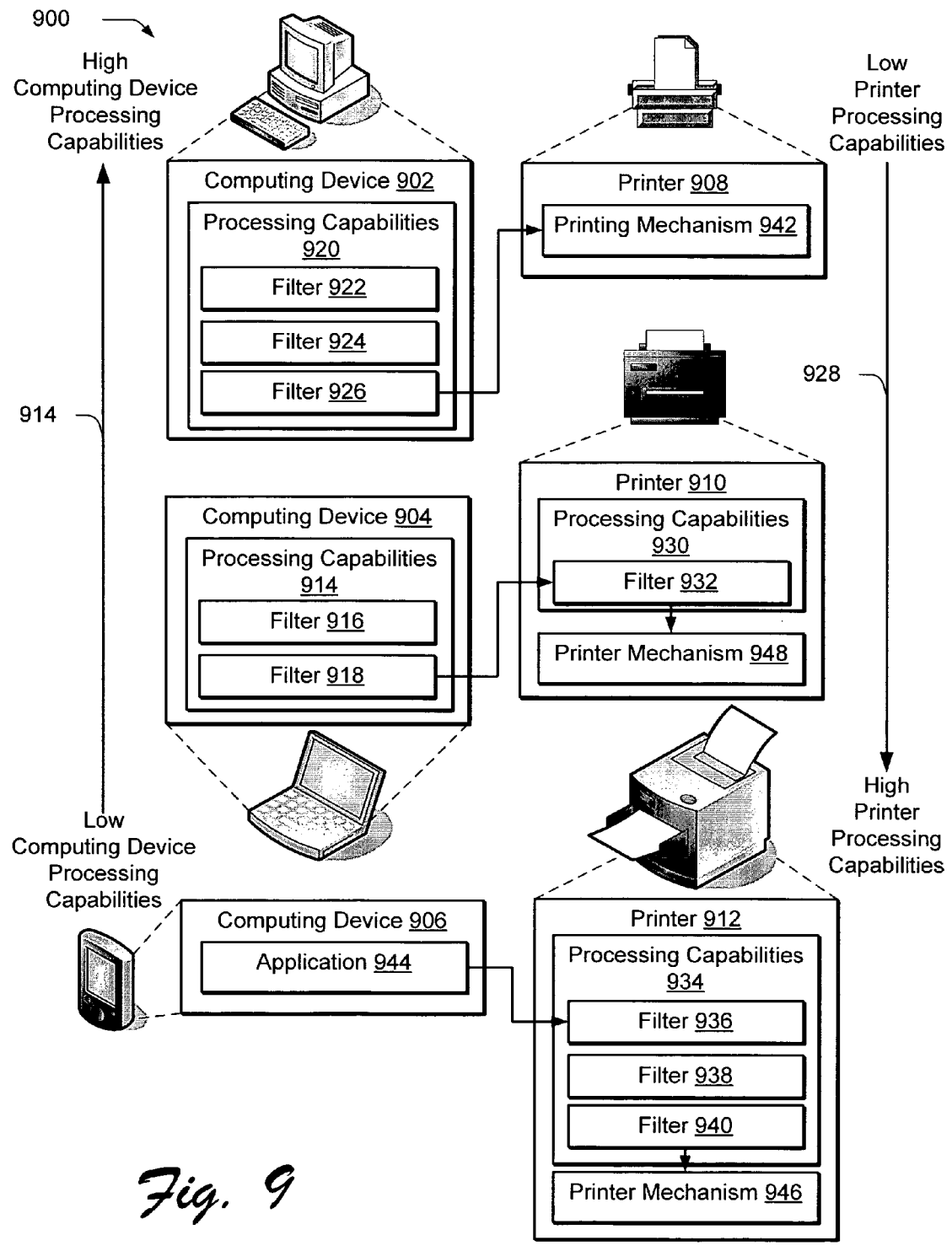
FIG. 9 is an illustration of a system in an exemplary implementation in which processing capabilities are flexibly provided by a plurality of computing devices and a plurality of rendering device.
Figure 10:
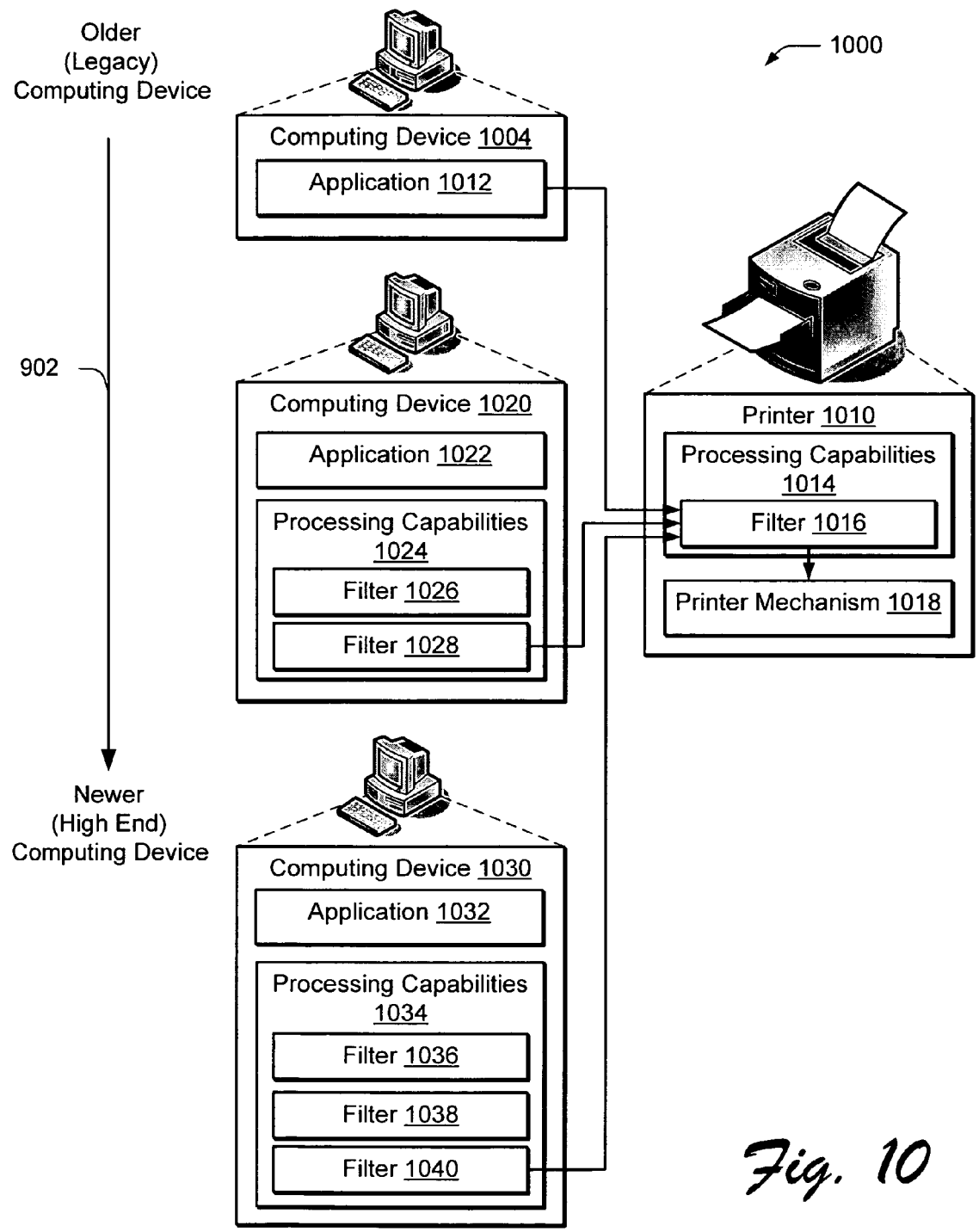
FIG. 10 is an illustration of a system in an exemplary implementation in which a hierarchy of processing capabilities of computing devices is shown, each of which having differing processing capabilities that are addressed through use of respective filter collections.
Figure 11:
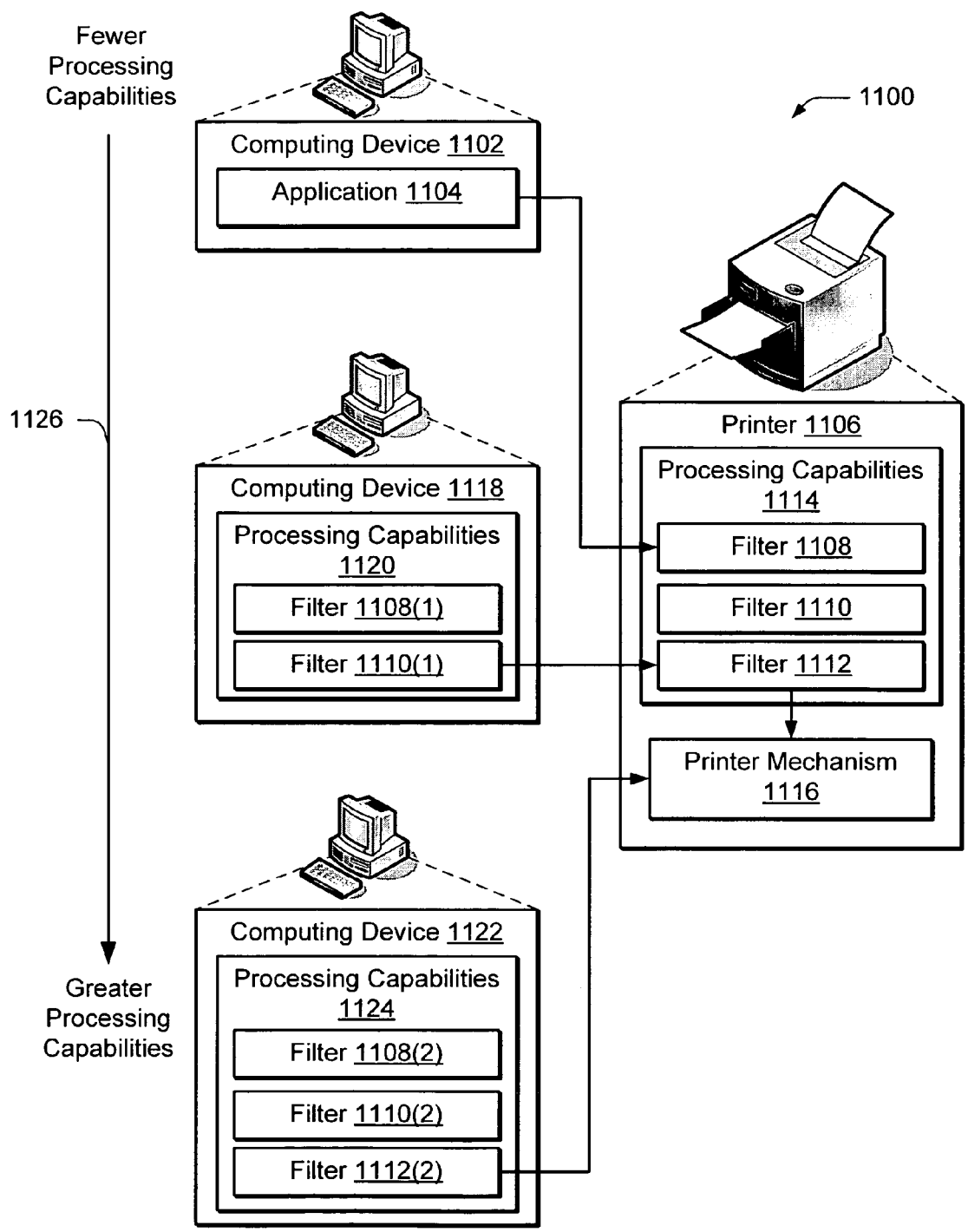
FIG. 11 is an illustration of a system in an exemplary implementation in which the printer includes processing capabilities that are provided through execution of a plurality of filters.

FIGS. 9, 10, and 11 illustrate exemplary implementations in which processing capabilities provided through collections of filters that provide differing and targeted functionality based on different collections of the filters. For instance, file container devices that consume a file container and/or package as native input data format may come in different forms and capability levels. By dividing drivers into a plurality of filters, a flexible way of distributing the processing workload between a computing device and a target entity is provided. For example, a high-end rendering device may consume file containers natively, and also apply a large number of transformations on the file container by utilizing one or more of a plurality of filters as previously described in relation to FIG. 7. Other rendering devices, however, might be limited such that they contain imaging code, but do not contain functionality for advanced document manipulation as previously described in relation to FIG. 6. Still other devices might implement a sub-set of imaging primitives that accept a minimal PDL as an input and require other primitives to be translated into the set of primitives that can be understood as previously described in relation to FIG. 8. Thus, a filter pipeline may be utilized to provide a flexible infrastructure that converts a file container produced and/or referenced by an application module (e.g., an application) into a capability level of the rendering device, which enables performance of transformations on the computing device and/or the rendering device, further discussion of which may be founding relation to the following figure.

FIG. 9 is an illustration of a system 900 in an exemplary implementation in which processing capabilities are flexibly provided by a plurality of computing devices 902, 904, 906 and a plurality of rendering device 908, 910, 912. The plurality of computing devices 902, 904, 906 is arranged in hierarchy 914 of processing capabilities 902 from high to low, respectively. For example, computing device 906 does not have processing capabilities, while computing device 904 includes processing capabilities 914 that are provided by filters 916, 918. Computing device 902 has even more processing capabilities 920 that are provided by filters 922, 924, 926.

Each of the computing devices 902, 904, 906 is communicatively coupled to a respective printer 908, 910, 912. Each of the printers 908, 910, 912 is also arranged in a hierarchy 928 of processing capabilities from low to high, respectively. For example, printer 908 does not have processing capabilities, while printer 910 includes processing capabilities 930 that are provided by a filter 932. Printer 912 has a greater amount of processing capabilities 934 that are provided through execution of filters 936, 938, 940.

To illustrate the flexibility of the system 900 through use of the filters, each of the computing device 902, 904, 906 and printer 908, 910, 912 combinations that are depicted may be considered to have matching processing capabilities, one to another. For example, computing device 902, which is illustrated as a desktop PC, has significant processing capabilities, while the corresponding printer 908 does not have processing capabilities. Therefore, the output of the filters 922, 924, 926 provides the processing capabilities and is printed directly by the printing mechanism 942.

Computing device 906, which is illustrated as a personal digital assistant (PDA), does not have processing capabilities. In this instance, the printer 912 includes processing capabilities 934 that are provided by filters 936-940. Thus, this may be considered an opposite scenario to the computing device 902 and corresponding printer 908 that were previously described.

A middle scenario is illustrated by the computing device 904, illustrated as a laptop computer, and the printer 910. In this scenario, both the computing device 904 and the printer 910 include respective processing capabilities 914, 930. Thus, the printing mechanism receives an input that was processed utilizing the processing capabilities of both the computing device 904 and the printer 910.

As shown in the illustration of FIG. 9, the arrangement of the filters of the computing devices 902-906 and the printers 908-912 may be used to efficiently implement and address the processing capabilities of each of the devices. For instance, processing capabilities of one device (e.g., printer 912) may be utilized to offset the lack of those particular processing capabilities on another device (e.g., computing device 906).

FIG. 10 is an illustration of a system 1000 in an exemplary implementation in which a hierarchy of processing capabilities 1002 of computing devices 1004, 1006, 1008 is shown, each of which having differing processing capabilities that are addressed through use of respective filter collections. The infrastructure, through the use of filters, may also be utilized to address different evolution rates of computing device capabilities and target entity capabilities, respectively. For instance, computing device software may obtain new processing capabilities that are not addressed by a rendering device, e.g. a printer 1010. Therefore, each of the computing devices 1004, 1006, 1008 may employ targeted collections of filters to ensure that the output of the computing devices 1002, 1004, 1006 having different processing capabilities are compatible with a rendering device (e.g. the printer 1010), without making changes to the rendering device. The targeted collections of filters, for instance, provide additional processing functionality on the computing devices 1004, 1006, 1008 to transform a file container that follows an updated capability model into a file container with a previous capability model that the device can understand. This is illustrated in FIG. 10 by processing capabilities on each of the computing devices having differing numbers of filters. For purposes of clarity in FIG. 10, the greater the number of filters illustrated in FIG. 10, the greater the number of conversions performed to translate "rich" documents into versions that are compatible with the printer. However, it should be realized that in other implementations filters can provide varying levels of processing.

Computing device 1004, for example, is illustrated as including an application 1012 that is compatible with the processing capabilities 1014 of the printer 1010. Specifically, the application 1012, when executed, is compatible with a filter 1016 that is executable to enable an output from the application 1012 to be printed by the printing mechanism 1018. Therefore, the computing device 1004 and application 1012 are directly compatible with the processing capabilities 1014 of the printer 1010.

Computing device 1020, however, is illustrated as including an application 1022 having additional processing capabilities such that an output from the application 1022 is not compatible with the processing capabilities 1014 of the printer 1010. Therefore, the computing device 1020 includes processing capabilities 1024 provided by a plurality of filters 1026, 1028 which are executable to process the output of the application 1022 such that it is compatible with the processing capabilities 1014 of the printer 1010.

Likewise, computing device 1030 is illustrated as including an application 1032 having additional processing capabilities over that of application 1022 of computing device

1020. Therefore, an output from the application 1032 is also not compatible with the processing capabilities 1014 of the printer 1010. The computing device 1030 includes processing capabilities 1034 provided by a plurality of filters 1036, 1038, 1040 which convert the output of the application 1032 such that it is compatible with the processing capabilities 1014 of the printer. Therefore, in the system 1000 of FIG. 10, different collections of filters are provided on the respective computing devices to provide "backward" compatibility with a legacy device (e.g., printer 1010).

FIG. 11 is an illustration of a system 1100 in an exemplary implementation in which the printer includes processing capabilities that are provided through execution of a plurality of filters. Each of the filters is executable to provide different levels of processing capabilities to transform a file container for rendering to a printed document. For example, computing device 1102 may include an application 1104 that provides an output for being printed by a printer 1106. The computing device 1102, however, does not include processing capabilities. Therefore, the printer 1106 includes a set of filters 1108, 1110, 1112 that provide processing capabilities 1114 to transform an output provided by the application 1104 such that the printing mechanism 1116 can provide a printed version of the output.

Computing device 1118 includes filters 1108(1), 1110(1) that provide processing capabilities 1120. The reference numbers for filters 1108(1), 1110(1) are utilized to illustrate that filters 1108(1), 1110(1) provide similar processing capabilities to respective filters 1108, 1110 that are included on the printer 1106. Therefore, because the computing device 1118 and the printer 1106 share some processing capabilities, the output from the computing device 1118 is not reprocessed by the shared filters 1108, 1110 of the printer 1106. Rather, the output of the computing device 1118 is passed to filter 1112 for processing to a form that is suitable for being rendered by the printing mechanism 1116.

Likewise, computing device 1122 includes filters 1108(2), 1110(2), 1112(2) that provide processing capabilities 1124. The reference numbers for filters 1108(2), 1110(2), 1112(2) are utilized to illustrate correspondence of the processing capabilities 1124 with the processing capabilities 1114 provided by respective filters 1108, 1110, 1112 that are included on the printer 1106. In this instance, because the computing device 1118 and the printer 1106 share similar processing capabilities 1114, 1124, the output from the computing device 1122 is not reprocessed by any of the filters 1108, 1110, 1112 of the printer 1106. Rather, the output of the computing device 1122 is in a form that is suitable for being rendered by the printing mechanism 1116 directly. In this way, the system 1100 of FIG. 11 provide differing levels of processing capabilities which are separately executable to process an output from different computing devices based on the processing capabilities of the computing devices. The different levels of processing capabilities are also depicted in FIG. 11 through use of an arrow 1126 that illustrates a spectrum of processing capabilities provided by the respective computing devices 1102, 1118, 1122.

Exemplary Procedures

The following discussion describes the different processing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 12:
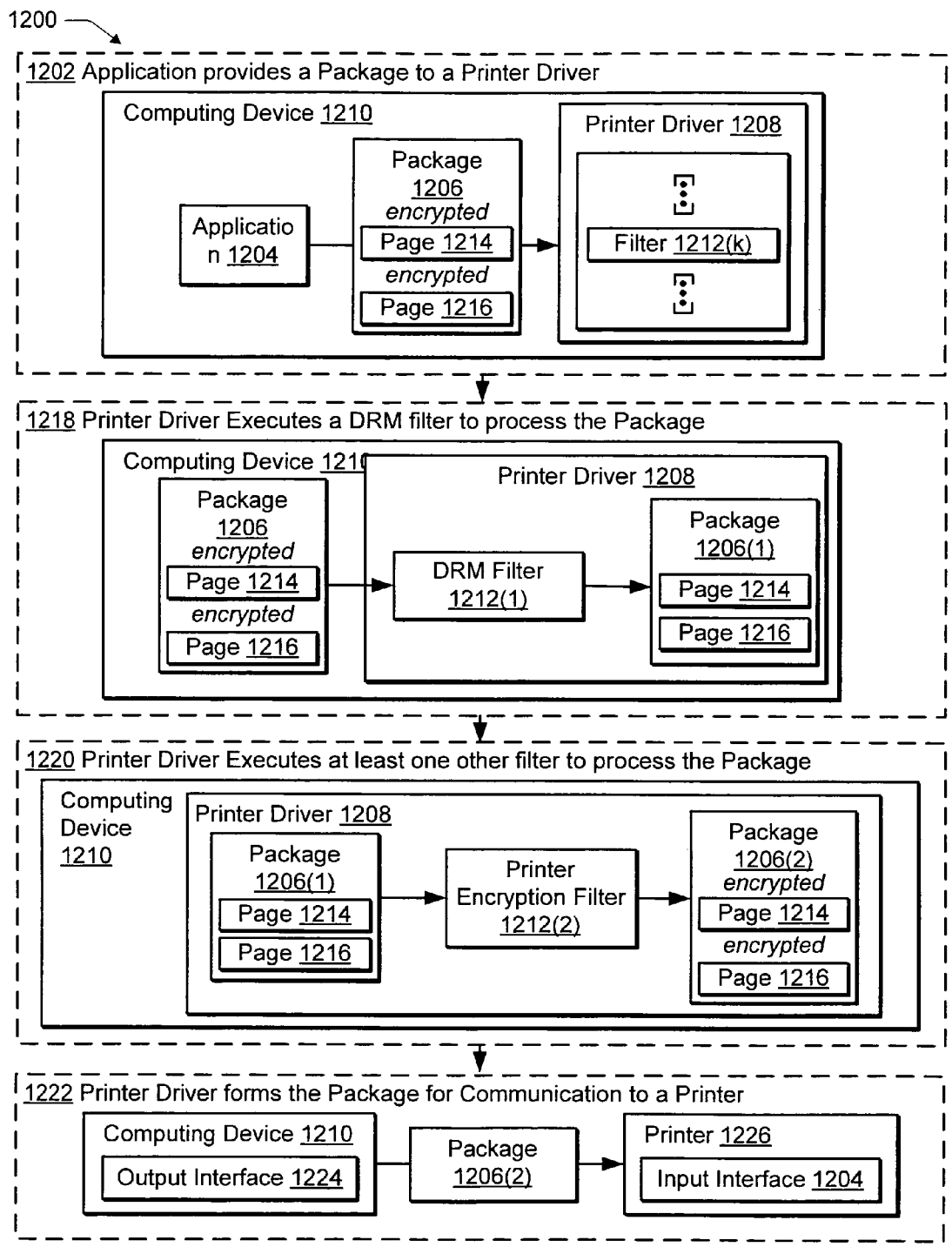
FIG. 12 is a flow diagram illustrating a procedure in an exemplary implementation in which a printer driver provided by a collection of filters preprocesses a package for output to a printer.

FIG. 12 is a flow diagram illustrating a procedure 1200 in an exemplary implementation in which a printer driver provided by a collection of filters preprocesses a file package for output to a printer. At block 1202, an application 1204 provides a package 1206 to a printer driver 1208. The package 1206 may be provided in a variety of ways, such as generated by the application 1204, via a memory address that is referenced by the application 1204, and so on.

The application 1204, package 1206, and printer driver 1208 are included on a computing device 1210, such as a desktop PC. The printer driver 1208 is provided by a plurality of filters 1212(*k*), where "k" can be any integer from one to "K". As previously described, each of the plurality of filters 1212(*k*) is executable to provide particular processing capabilities.

The package 1206 is illustrated as having a plurality of pages, which are depicted in FIG. 12 as pages 1214, 1216. Each of the plurality of pages 1214, 1216 is separately encrypted, which is illustrated with the italicized word "encrypted" in FIG. 12 above each of the pages 1214, 1216. In this implementation, the pages 1214, 1216 are encrypted for DRM purposes. It should be noted that there is no lock on the overall package, i.e. the package 1206 format itself is not encrypted, and therefore the package is recognizable by structurally-aware software and hardware as described in relation to FIG. 2.

At block 1218, the printer driver 1208 executes a DRM filter 1212(1) to process the package 1206. For example, the printer driver 1208 may be configured to determine whether a printer is capable of recognizing that the package 1206 is encrypted for DRM purposes. In this instance, the printer is incapable of recognizing encryption supported by the DRM system. Therefore, the DRM filter 1212(1) is executed to gain DRM access rights to the pages 1214, 1216, such as by providing necessary payment information, determining whether a user has already obtained DRM access rights to the pages 1214, 1216, and so on. When the DRM access rights have been obtained, the DRM filter 1212(1) is executed to process the package 1206 to form package 1206(1). Package 1206(1) has the encryption provided through DRM removed, which is illustrated through the absence of the italicized "encrypted" text in package 1206(1) from package 1206. The processed package 1206(1) utilizes reference number 1206(1) to indicate that the processed package 1206(1) corresponds to package 1206 and was processed by DRM filter 1204(1).

At block 1220, the printer driver 1208 executes a printer encryption filter 1212(2) to re-encrypt the file package 1206(1) for the particular printer. For example, the printer encryption filter 1212(2) may utilize a public key of a public/private key pair of an asymmetric encryption algorithm. The printer includes the corresponding private key to decrypt data that is encrypted utilizing the public key. In this way, the pages 1214, 1216 are protected from unauthorized access. It should be noted again that in this implementation other components of the package 1206(2) are not encrypted, meaning that each of the page 1214, 1218 is open within the structure of the package 1206(2).

At block 1222 the printer driver 1208 forms the package 1206(2) for communication over an output interface 1224 to a printer 1226. The output interface 1224 may be configured as a wide variety of output interfaces that provide local and/or remote (i.e., network) communication with the printer 1226. The printer 1226 includes an input interface 1228 for receiving the package 1206(2).

Thus, in this implementation, one or more of the filters are configured to separately address the structure of the package

1206. For instance, the DRM filter 1212(1) that performed the DRM operation does not need to "understand" how to render the pages 1214, 1216, or even understand the concept of a page. The DRM filter 1212(1) simply understands that there are two objects in the package 1206 that have DRM (i.e. conditional access) information. The DRM filter 1212(1), therefore, determines whether the user has obtained conditional rights to the content, obtains a key to decrypt the pages, and processes the pages. Thus, the described hierarchical (i.e. layered) model provides targeted functionality based on the structure of the container through use of the plurality of filters 1212(k). This, in turn, enables the provision of a software module composed of one or more of the filters that need not address each of the components of the container. In existing PDLs, this is not possible because the formats are intermixed and entangled, therefore preventing the splitting of functionality, such as workload sharing as previously described.

Figure 13:
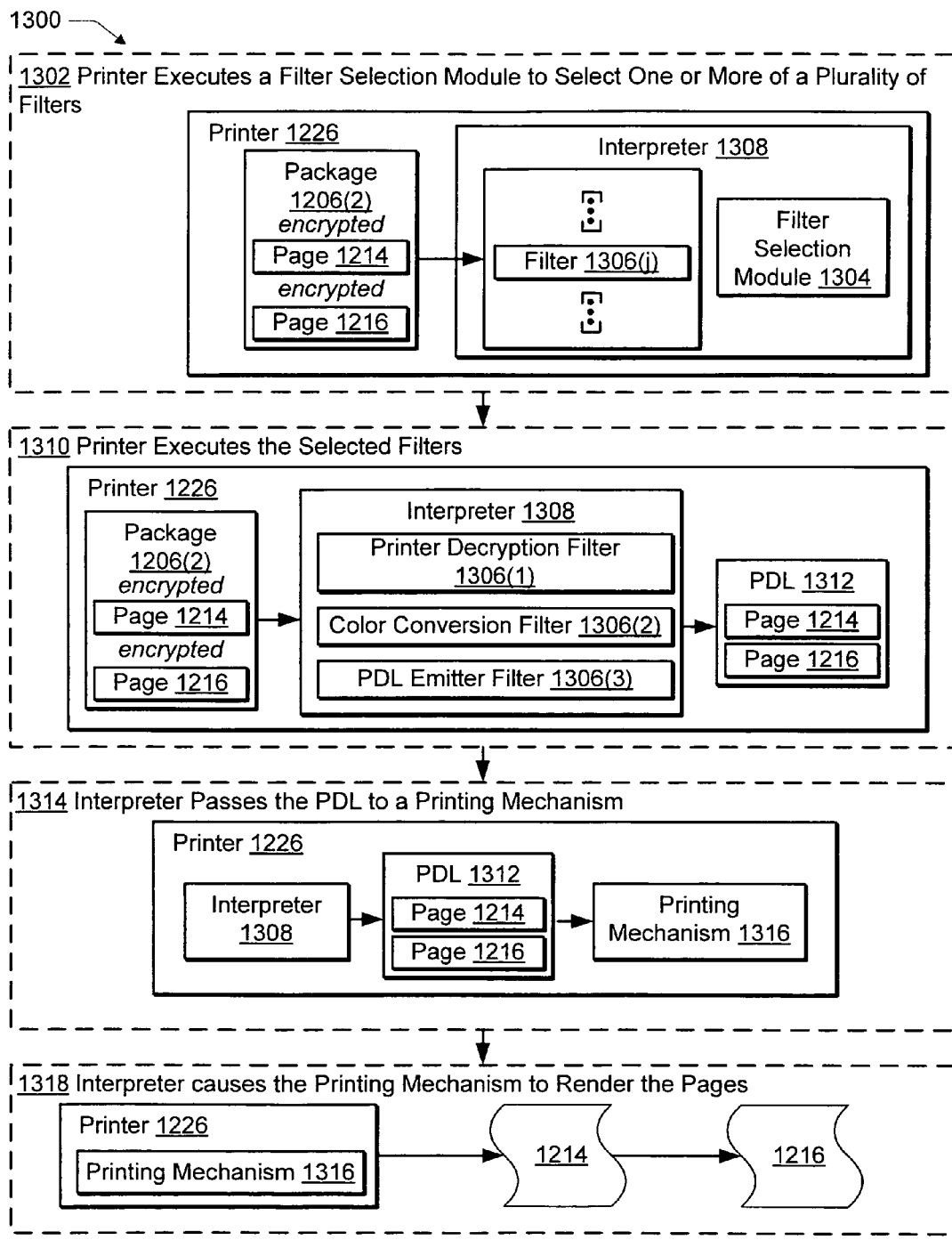
FIG. 13 is a flow diagram depicting a procedure in an exemplary implementation in which the printer processes and renders the package of FIG. 12.

FIG. 13 is a flow diagram depicting a procedure 1300 in an exemplary implementation in which the printer 1226 processes and renders the package 1206(2) of FIG. 12. At block 1302, the printer 1226 executes a filter selection module 1304 (which may or may not correspond to the filter logic 232 of FIG. 2) to select one or more of a plurality of filters 1306(j), where "j" can be any integer from one to "J", to process the package 1206(2). The plurality of filters 1306(j) is included in an interpreter 1308 module in the printer 1226. As previously described, by dividing the plurality of filters 1212(k), 1306(j) for execution on the computing device 1210 and the printer 1226, respectively, the processing workload may be divided between the respective devices. Thus, the printer driver 1208 of the computing device 1210 may act as a "simplified" driver and the interpreter 1308 utilized to complete the processing of the package 1206. The package 1206(2) output by the printer driver 1208, for instance, may be an intermediate form of the package 1206 that is unreadable by the application 1204 of FIG. 12 and is not yet suitable to be rendered by the printer 1226.

The filter selection module 1304 may select one of more of the plurality of filters 1306(j) in a variety of ways. For example, the package 1206(2) may include one or more print tickets, as previously described in relation to FIG. 2, that identify particular processing operations that have been performed and/or are to be performed to process the package 1206(2) into a renderable format. The filter selection module 1304, when executed, therefore examines the package 1206(2) to determine what processing should be performed, and selects one or more of the filters 1306(j) based on the determination. Although the filter selection module 1304 is illustrated separately from the filters 1306(j), the functionality of the filter selection module 1304 may be incorporated into the filters 1306(j). For instance, each of the filters 1306(j) may be executable to determine whether the package 1206(2) is to be processed by that filter, and if so, perform the processing.

At block 1310, the printer 1226 executes the selected filters. For example, the filter selection module 1304 may select a printer decryption filter 1306(1), color conversion filter 1306(2) and a PDL emitter filter 1306(3) from the plurality of filters 1306(j) at block 1302. The selected filters process the package 1206(2) in succession to provide an output of a PDL 1312 having the pages 1214, 1216. For instance, the printer decryption filter 1306(1), when executed, utilizes a private key in an asymmetric decryption algorithm to decrypt the encrypted pages 1214, 1216. The color conversion filter 1306(2), when executed, processes the decrypted pages 1214, 126 to process the pages 1214, 1216 to have colors which are compatible with the printer 1216. The color processed pages are then processing by the PDL emitter filter 1306(3) to form the PDL 1312 having the pages 1214, 1216 which is recognizable (i.e., compatible) such that the pages 1214, 1216 can be rendered.

At block 1314, the interpreter 1308 passes the PDL 1312 to a printing mechanism 1316 for being rendered. At block 1318, the PDL 1312 causes the printing mechanism 1316 to render the pages 1214, 1216.

Figure 14:
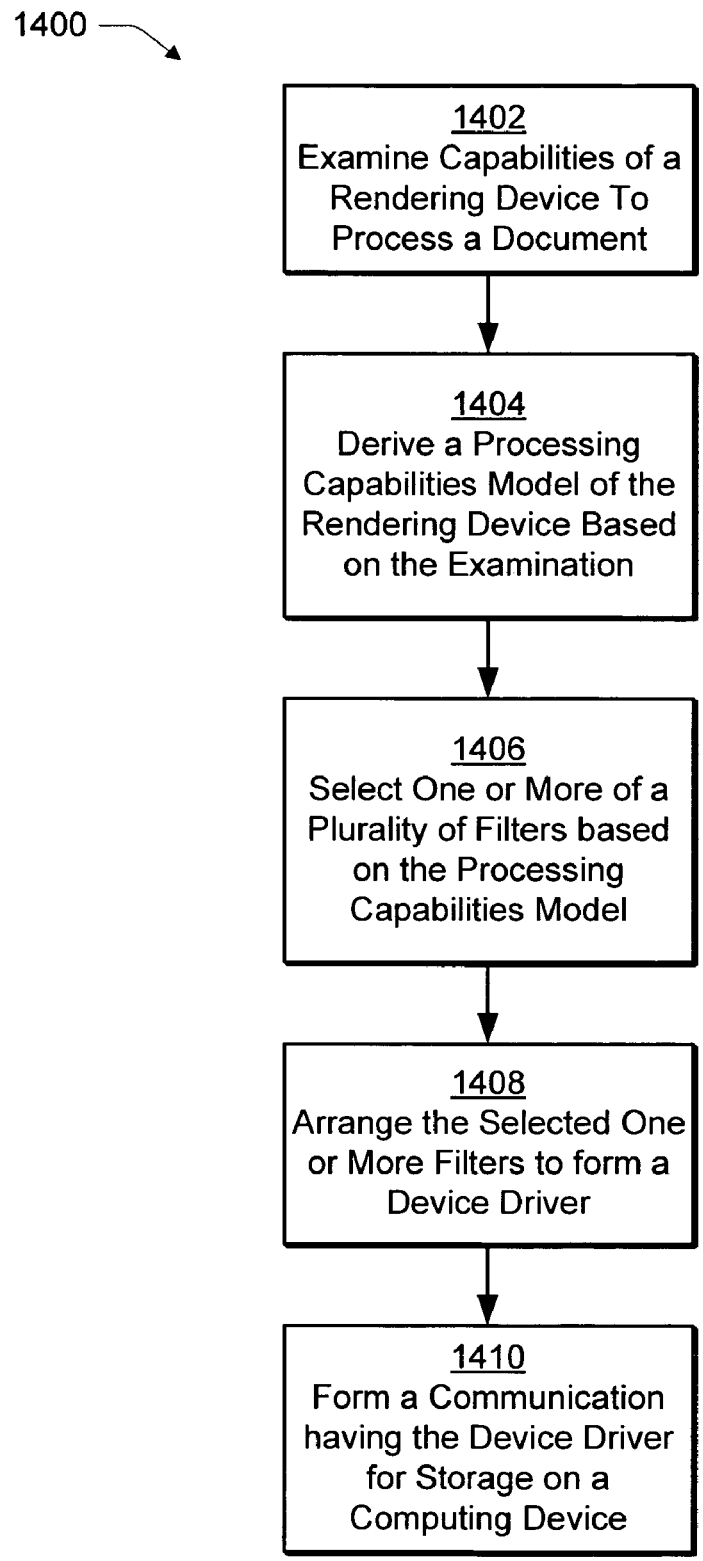
FIG. 14 is a flow chart depicting a procedure in an exemplary implementation in which a processing capabilities model is derived for a target entity and utilized to create a device driver for that rendering device.

FIG. 14 is a flow chart depicting a procedure 1400 in an exemplary implementation in which a processing capabilities model is derived for a target entity and utilized to create a device driver for that rendering device. As previously described in relation to FIGS. 5-11, there are a wide variety of different processing capabilities that may be provided on a computing device and a target entity. A feature-rich rendering device, for instance, can accept content and access resources from over a network (e.g., the Internet) to process the content such that it can be rendered by the rendering device. In another instance, a "thin" rendering device having limited processing resources may receive interleaved content from a printer driver at that includes bands or pages worth of data for processing. To support these differing capabilities, the computing device may derive a model describing the processing capabilities of the rendering device and create a device driver that is used to process content to a format that is recognizable by the rendering device.

At block 1402, for example, a processing module that includes a plurality of filters examines the capabilities of a rendering device to process application content. At block 1404, the processing module is executed to derive a processing capabilities model of the rendering device based on the examination. For example, the processing module may determine the processing capabilities of rendering device and select a processing capabilities model that has corresponding processing capabilities from a plurality of preconfigured processing capabilities models that are stored in memory.

At block 1406, the processing module selects one or more of the plurality of filters based on the processing capabilities model. Each processing capabilities model, for instance, may reference one or more of the filters that are to be utilized to process application content such that it can be rendered by the rendering device. At block 1408, the selected filters are arranged to form a device driver for the rendering device. For example, the processing module may determine an order each filter should be arranged such that each filter provides an output that is compatible with a successive filter in a filter pipeline. At this point, the processing module may also add additional filters to supply any necessary conversions. At block 1410, the processing module forms a communication having the device driver for storage on a computing device. A variety of communications can be formed, such as a message that is storable in memory of a computing device that executes the processing module, computer executable instructions that are written to a computer readable medium for use by another computing device, computer executable instructions that are to be transmitted over a network, and so on. Although the procedure 1400 of FIG. 14 described the creation of a device driver based on the processing capabilities of the rendering device, an interpreter may also be configured in a similar manner by the rendering device based on the processing capabilities of a computing device.

In the described procedure 1400 of FIG. 14, the processing module installs filters on a computing device based on the processing capabilities of the rendering device, thereby providing differing collections of filters based on the rendering capabilities of the rendering device. The processing capabilities may be determined in a variety of other ways. For instance, a stack description may be provided by a vendor that defines the processing capabilities of the rendering device. In another instance, the rendering device and/or computing device can announce its processing capabilities such that the device driver and/or interpreter may be formed. In response to the announcement, for example, a computing device may add additional filters to a device driver based on the announced capabilities, thereby providing dynamic negotiation of capabilities between the device and the driver. In another example, both the computing device and the rendering device select and arrange filters based on the collective processing capabilities. Thus, the device driver and the interpreter may negotiate based on the processing capabilities of each device, such as through negotiations of features. In an implementation, the rendering device has fixed capabilities such that there is a static set of capabilities and the processing module determines which additional processing capabilities are desired to process a document. In another instance, the rendering device has changing capabilities and the processing module dynamically derives the device driver and/or interpreter based on those capabilities.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A system comprising:
a first rendering device having a first set of filters that is executable thereon to process data for rendering, wherein a filter corresponds to a respective processing capability for processing data being rendered and the first set of filters are included on the first rendering device having a first filter selection module, wherein the first filter selection module determines what processing should be performed and selects one or more of the filters in the first set of filters based on the determination;
a second rendering device having a second set of filters that is executable thereon to process data for rendering, wherein the second set of filters are included on the second rendering device having a second filter selection module, wherein the second filter selection module determines what processing should be performed and selects one or more of the filters in the second set of filters based on the determination;
a computing device that is communicatively coupled to the first and the second rendering devices, and has a third set of filters and a third filter selection module, wherein the third filter selection module is executable on the computing device to:
select a first collection of the third set of filters to process data for communication to and processing by the first set of filters of the first rendering device; and
select a second collection of the third set of filters to process data for communication to and processing by the second set of filters of the second rendering device, wherein the second collection of the third set of filters comprises a subset of the first collection of the third set of filters; and
wherein each of the first, second and third filter selection modules operates independent of another filter selection module.

2. A system as described in claim 1, wherein the first and the second rendering devices are printers.

3. A system as described in claim 1, wherein:
the first collection forms a first device driver that corresponds to the first rendering device; and
the second collection forms a second device driver that corresponds to the second rendering device.

4. A system as described in claim 1, wherein the data is included in a package having a hierarchical structure of a plurality of levels, wherein:
at least one said level specifies a job for being rendered;
at least one said level specifies one or more documents associated with the job;
at least one said level specifies one or more versions associated with the one or more documents; and
at least one said level specifies one or more pages associated with the one or more versions.

5. A rendering device comprising:
a rendering mechanism;
a processor communicatively coupled to the rendering mechanism; and
memory configured to maintain:
a plurality of filters, each of which being executable on the processor to provide a corresponding processing capability; and
a processing module that is executable on the processor to:
determine one or more processing capabilities of a computing device to process data, wherein the data is included in a package having a hierarchical structure of a plurality of levels, wherein:
a first level specifies a job for being rendered on the rendering device;
a second level specifies one or more document types associated with the job, wherein each respective document type is determined by an originating application;
a third level specifies one or more versions associated with the one or more documents; and
a fourth level specifies one or more pages associated with the one or more versions;
metadata associated with each level identifies information pertaining to the job being rendered, wherein the information comprises an author who created the job and a time the document contained in the job as created;
select one or more said filters based on the determined processing capabilities of the computing device; and
arrange the selected one or more said filters to form an interpreter module that is executable on the processor to convert the data processed by and received from the computing device such that it is capable of being rendered by the rendering mechanism;
wherein the processing module includes a filter selection module that is executable on the processor to:
select a first collection of said filters based on one or more processing capabilities of a first said computing device such that data processed by the first collection of said filters is suitable for being rendered by the rendering mechanism; and
select a second collection of said filters based on one or more processing capabilities of a second said computing device such that data processed by the second collection of said filters is suitable for being rendered by the rendering mechanism, wherein the second collection of said filters comprises a subset of the first collection of said filters.

6. A rendering device as described in claim 5, wherein the rendering mechanism is a printing mechanism.

7. A rendering device as described in claim 5, wherein the rendering mechanism is a screen of a display device.

8. A rendering device as described in claim 5, wherein the one or more processing capabilities of the computing device are provided by a plurality of said filters arranged to form a device driver that is executable on the computing device.

9. A rendering device as described in claim 5, wherein the processing module is executable to determine the one or more processing capabilities by examining the computing device.

10. A rendering device as described in claim 5, wherein the processing module is executable to determine the one or more processing capabilities by receiving an announcement of the one or more processing capabilities of the computing device at the rendering device.

11. A rendering device as described in claim 5, wherein:

each said filter in the interpreter module is combinable to create one or more collections; and each said collection supports one of a plurality of differing said processing capabilities of respective said computing devices.

* * * * *